(12) United States Patent
Liu et al.

(10) Patent No.: US 12,390,802 B2
(45) Date of Patent: Aug. 19, 2025

(54) DEFECT ENGINEERING AND MODIFICATION OF SUBSTRATES FOR SUPPORTED METAL/METAL OXIDE CATALYSTS

(71) Applicant: University of Central Florida Research Foundation, Inc., Orlando, FL (US)

(72) Inventors: Fudong Liu, Orlando, FL (US); Shaohua Xie, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/390,793

(22) Filed: Dec. 20, 2023

(65) Prior Publication Data

US 2024/0189806 A1   Jun. 13, 2024

Related U.S. Application Data

(60) Continuation of application No. 17/858,774, filed on Jul. 6, 2022, now Pat. No. 12,102,993, which is a (Continued)

(51) Int. Cl.
  *B01J 37/02* (2006.01)
  *B01J 23/42* (2006.01)
  (Continued)

(52) U.S. Cl.
  CPC .......... *B01J 37/0201* (2013.01); *B01J 23/42* (2013.01); *B01J 37/08* (2013.01); *B01J 37/16* (2013.01)

(58) Field of Classification Search
  CPC ........ B01J 37/0201; B01J 23/42; B01J 37/08; B01J 37/16
  See application file for complete search history.

(56) References Cited

U.S. PATENT DOCUMENTS 5,001,103 A * 3/1991 Koberstein .............. B01J 23/58
                                                              502/262

FOREIGN PATENT DOCUMENTS

WO        0226619 A2        4/2002

OTHER PUBLICATIONS

Cargnello, M. et al., "Control of Metal Nanocrystal Size Reveals Metal-Support Interface Role for Ceria Catalysts", Science 341, pp. 771-773 (2013).

(Continued)

*Primary Examiner* — Sally A Merkling
*Assistant Examiner* — Logan Edward Laclair
(74) *Attorney, Agent, or Firm* — Suiter Swantz IP

(57) ABSTRACT

A catalyst support structure may include a base material and a metal oxide support structure. The metal oxide support structure may be formed by loading a first concentration of precursors of a metal oxide onto the base material using incipient wetness impregnation (IWI) to form the catalyst support structure, performing a first calcination process on the catalyst support structure at a first temperature to produce first structures of the metal oxide, loading a second concentration of precursors of the metal oxide onto the catalyst support structure using IWI to at least partially cover the first structures of the metal oxide, and performing a second calcination process on the catalyst support structure at a second temperature lower than the first temperature to produce second structures of the metal oxide.

15 Claims, 23 Drawing Sheets

Related U.S. Application Data division of application No. 17/152,317, filed on Jan. 19, 2021, now Pat. No. 11,890,608, application No. 18/390,793, filed on Dec. 20, 2023 is a continuation of application No. 17/152,317, filed on Jan. 19, 2021, now Pat. No. 11,890,608.

(60) Provisional application No. 62/962,408, filed on Jan. 17, 2020.

(51) Int. Cl.
B01J 37/08 (2006.01)
B01J 37/16 (2006.01)

(56) References Cited

OTHER PUBLICATIONS

Cargnello, M. et al., "Exceptional Activity for Methane Combustion of Modular Pd@CeO2 Subunits on Functionalized Al2O3", Science 337 pp. 713-717 (2012).
Chen, B. et al., "Plasma-Assisted Surface Interactions of Pt/CeO2 Catalyst for Enhanced Toluene Catalytic Oxidation." Catalysts 9(1):2 (2019), 18 pages.
Diogo F.M. Santos, et al. "Preparation of ceramic and metallic monoliths coated with cryptomelane as catalysts for VOC abatement", Chemical Engineering Journal 382 (2020) 122923.
Ganzler, A.M. et al., "Tuning the Pt/CeO2 Interface by in Situ Variation of the Pt Particle Size," ACS Catal. 8 (6), pp. 4800-4811 (2018).
Ganzler, A.M. et al., "Tuning the Structure of Platinum Particles on Ceria In Situ for Enhancing the Catalytic Performance of Exhaust Gas Catalysts", Angew.Chem. Int. Ed. 56, pp. 13078-13082 (2017).
Jan, A. et al., "Promotion of Pt/CeO2 catalyst by hydrogen treatment for low-temperature CO oxidation", RSC Adv., 2019,9, 27002-27012, 11 pages.
Jiang, D. et al., "Insights into the Surface-Defect Dependence of Photoreactivity over CeO2 Nanocrystals with Well-Defined Crystal Facets", ACS Catal. 5, pp. 4851-4858 (2015).
Joo, S.H. et al., "Thermally stable Pt/mesoporous silica core-shell nanocatalysts for high-temperature reactions", Nat. Mater. 8 pp. 126-131 (2009).
Minhong Jiang, et al. "A comparative study of CeO2-Al2O3 support prepared with different methods and its application on MoO3/CeO2-Al2O3 catalyst for sulfur-resistant methanation", Applied Surface Science 285P (2013) 267-277.
Munnik et al (Recent Developments in the Synthesis of Supported Catalysts, Chemical Reviewed, 2015).
Nasrallah M. Deraz, "The comparative jurisprudence of catalysts preparation methods: I. precipitation and impregnation methods", https://www.alliedacademies.org/journal-industrial-environmental-chemistry/ Mar. 5, 2018, J. Ind Environ Chem 2018, vol. 2, Issue 1.
Nie, L. et al., "Activation of surface lattice oxygen in single-atom Pt/CeO2 for low-temperature CO oxidation", Science 358, pp. 1419-1423 (2017).
Pereira-Hernández, X.I. et al., "Tuning Pt-CeO2 interactions by high-temperature vapor-phase synthesis for improved reducibility of lattice oxygen", Nat Commun 10, 1358 (2019). https://doi.org/10.1038/s41467-019-09308-5Nat.Commun. 2019, 10: 3808, 10 pages.
Queiroz, C.M.S. et al., "Active Pt/CeO2 catalysts prepared by an alcohol-reduction process for low-temperature CO-PROX reaction", Mater Renew Sustain Energy 8, 17 (2019). https://doi.org/10.1007/s40243-019-0155-y, 8 pages.
Tavakkoli, M. et al., "Single-Shell Carbon-Encapsulated Iron Nanoparticles: Synthesis and High Electrocatalytic Activity for Hydrogen Evolution Reaction", Angew.Chem. 127, pp. 4618-4621 (2015).
Wang, L. et al., "Oxygen vacancy clusters essential for the catalytic activity of CeO2 nanocubes for o-xylene oxidation", Sci Rep 7, 12845 (2017). https://doi.org/10.1038/s41598-017-13178-6, 11 pages.

* cited by examiner

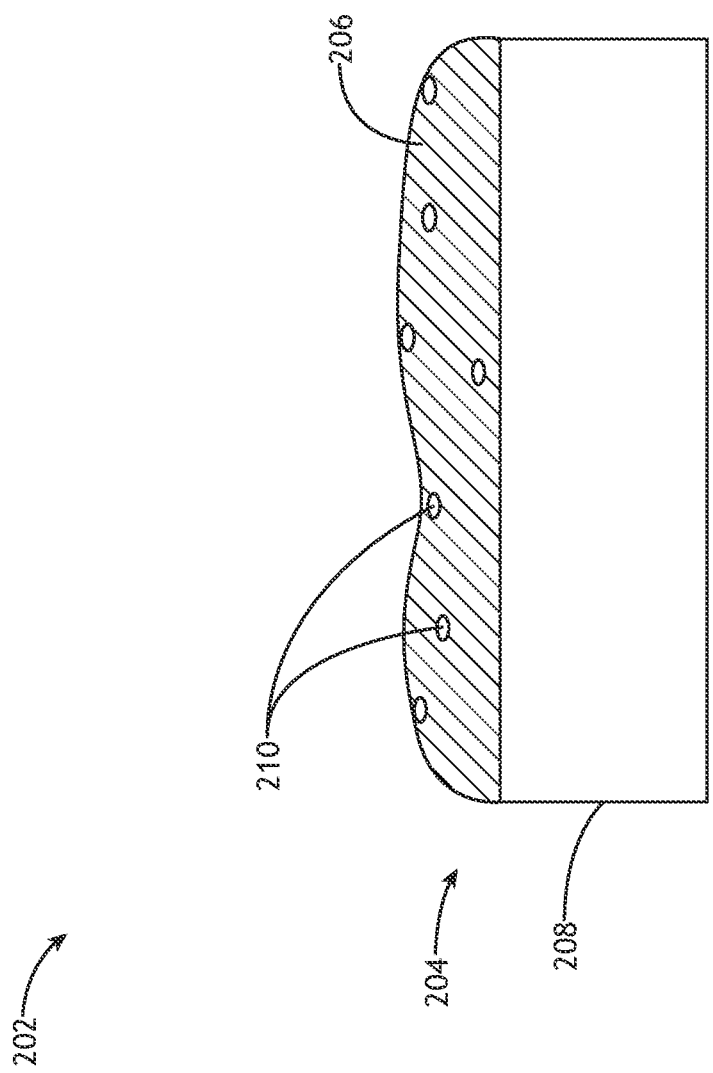

DEFECT ENGINEERING AND MODIFICATION OF SUBSTRATES FOR SUPPORTED METAL/METAL OXIDE CATALYSTS

CROSS-REFERENCE TO RELATED APPLICATION

The present application is a continuation of and claims priority to U.S. patent application Ser. No. 17/858,774 filed Jul. 6, 2022, which is a divisional application of U.S. patent application Ser. No. 17/152,317 filed Jan. 19, 2021, which claims the benefit of U.S. Provisional Patent Application No. 62/962,408 filed on Jan. 17, 2020; the present application is also a continuation of and claims priority to U.S. patent application Ser. No. 17/152,317 filed Jan. 19, 2021, which claims the benefit of U.S. Provisional Patent No. 62/962,408 filed on Jan. 17, 2020; U.S. patent application Ser. No. 17/858,774, U.S. patent application Ser. No. 17/152,317, and U.S. Provisional Patent No. 62/962,408 are all incorporated herein by reference in their entireties.

TECHNICAL FIELD

The present disclosure relates generally to precious metal catalysts and, more particularly, to defect engineering and substrate modification for supported metal/metal oxide catalysts.

BACKGROUND

Increasingly stringent fuel economy and emissions standards driven by sustainable energy and environmental concerns are placing new challenges on catalytic treatment systems used to remove pollutants from exhaust from gas and/or diesel engines. In particular, it is increasingly desirable to utilize catalytic systems for exhaust at relatively low temperatures (e.g., at or below 150° C.). Further, thermal durability of emission control catalysts is essential to survive harsh conditions encountered in automotive exhaust. For example, future catalytic systems will be expected to provide efficient removal (e.g., greater than 90% removal) of pollutants such as, but not limited to, hydrocarbons (HC), carbon monoxide (CO) or nitrogen oxides (NOx) even after severe aging.

Precious metal or base metal/metal oxide catalysts on reducible metal oxide supports are promising technologies for automotive exhaust control due to their excellent activity at low temperature. Reducible oxides may provide chemical anchoring of precious metal and/or base metal/metal oxide catalysts through enhanced strong metal-support interactions (SMSI) to promote high activity and stability of the loaded catalysts. For example, reducible oxides such as, but not limited to, ceria ($CeO_2$) are widely investigated for use as catalytic supports due to their ability to store and release oxygen dynamically, which is beneficial for precious metal or base metal/metal oxide dispersion and forming strong metal-support interaction. However, several challenges remain that impede the widespread adoption of such technologies including limited naturally-occurring surface area defects on ceria supports for precious metal or base metal/metal oxide anchoring and limited thermal stability of reducible metal oxide supports relative to more widely used materials such as $Al_2O_3$.

It is therefore desirable to provide systems and methods for curing the deficiencies described herein.

SUMMARY

A method is disclosed in accordance with one or more illustrative embodiments of the present disclosure. In one illustrative embodiment, the method includes loading a first concentration of metal oxide onto a base material using incipient wetness impregnation (IWI) to form a catalyst support structure. In another illustrative embodiment, the method includes performing a first calcination process on the catalyst support structure. In another illustrative embodiment, the method includes loading a second concentration of the metal oxide onto the catalyst support structure using IWI, where the second concentration of the metal oxide at least partially covers the first concentration of metal oxide. In another illustrative embodiment, the method includes performing a second calcination process on the catalyst support structure, where the catalyst support structure includes multi-scale structures of the metal oxide.

A catalyst support structure is disclosed in accordance with one or more illustrative embodiments of the present disclosure. In one illustrative embodiment, the catalyst support structure includes a base material. In another illustrative embodiment, the catalyst support structure includes a metal oxide support structure. In another illustrative embodiment, the metal oxide support structure is formed by loading a first concentration of metal oxide onto the base material using incipient wetness impregnation (IWI) to form the catalyst support structure. In another illustrative embodiment, the metal oxide support structure is further formed by performing a first calcination process on the catalyst support structure. In another illustrative embodiment, the metal oxide support structure is further formed by loading a second concentration of the metal oxide onto the catalyst support structure using IWI, where the second concentration of the metal oxide at least partially covers the first concentration of metal oxide. In another illustrative embodiment, the metal oxide support structure is further formed by performing a second calcination process on the catalyst support structure, where the first concentration of metal oxide and the second concentration of metal oxide combine to form the metal oxide support structure.

A method for fabricating a catalyst is disclosed in accordance with one or more illustrative embodiments of the present disclosure. In one illustrative embodiment, the method includes receiving a metal oxide support structure. In another illustrative embodiment, the method includes reducing the metal oxide support structure with a gas-phase reducing agent to generate a plurality of defect sites on a surface of the metal oxide. In another illustrative embodiment, the method includes loading a catalyst material including at least one of a precious metal, a base metal, or a metal oxide onto the metal oxide support structure to generate a catalyst structure, where at least a portion of the catalyst material attaches to the plurality of defect sites. In another illustrative embodiment, the method includes performing a calcination on the catalyst structure.

A catalyst is disclosed in accordance with one or more illustrative embodiments of the present disclosure. In one illustrative embodiment, the catalyst includes a metal oxide support structure, where the metal oxide support structure is reduced with a gas-phase reducing agent to generate a plurality of defect sites on a surface of the metal oxide support structure. In another illustrative embodiment, the catalyst includes a plurality of catalytically active sites associated with the plurality of defect sites, where the plurality of catalytically active sites are formed by loading a catalyst material including at least one of a metal or a metal oxide onto the metal oxide support structure to generate a catalyst structure, where at least a portion of the catalyst material attaches to the plurality of defect sites, and performing a calcination process on the catalyst structure.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 2C is a diagrammatic view of a precious metal catalyst after deposition of precious metals on the single-step IWI support structure and a second calcination process to stabilize the full catalyst in accordance with one or more embodiments of the present disclosure.

DETAILED DESCRIPTION

Figure 1:
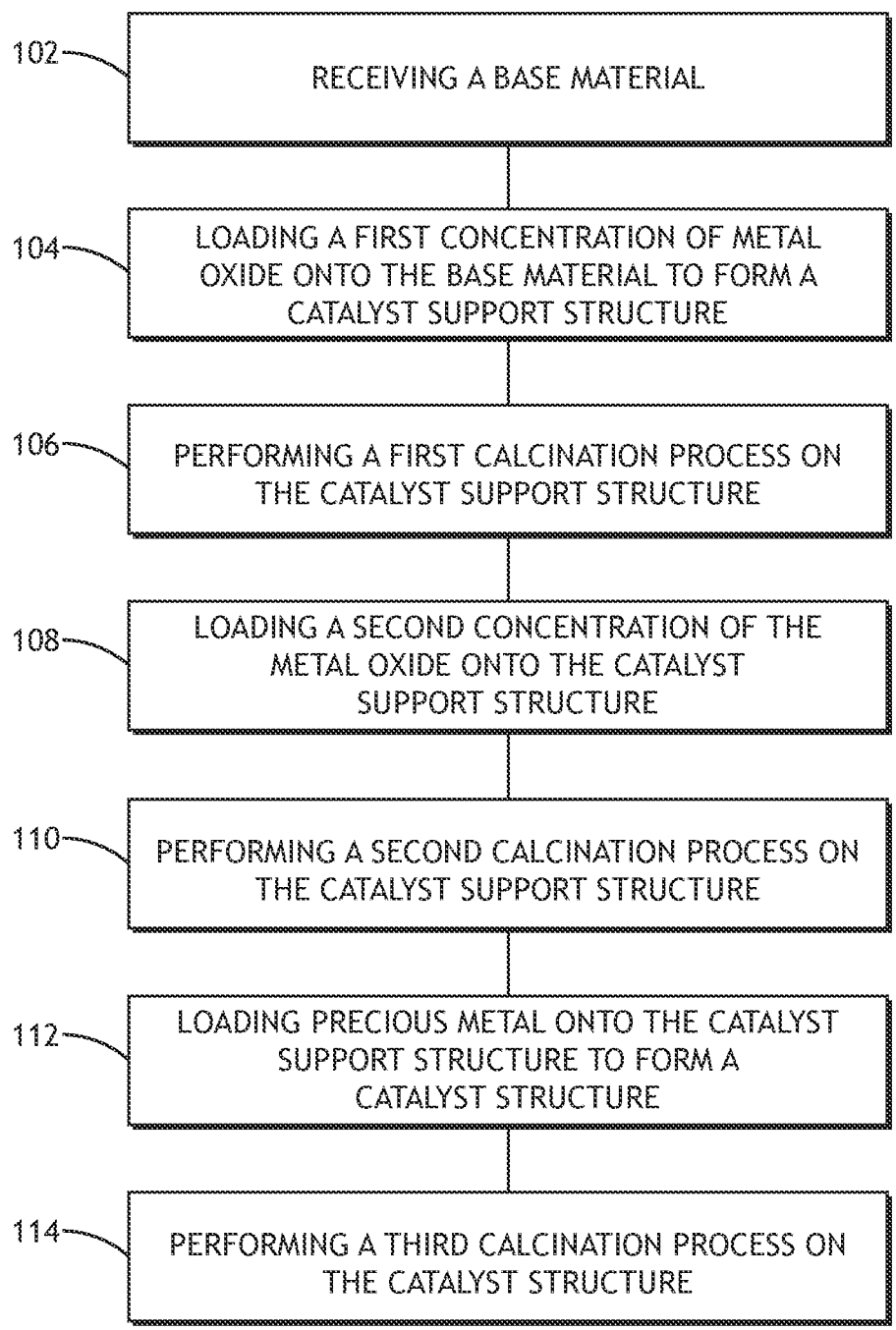
FIG. 1 is a block diagram of a method for fabricating a metal oxide support for a catalyst structure using multi-step IWI in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to metal or metal oxide catalysts with reducible metal oxide supports that are thermally stable and suitable for low-temperature operation such as, but not limited to, operation below 150° C. For example, metals or metal oxides suitable for use as catalysts include, but are not limited to, precious metals including Pt, Pd, Rh, Ir, or Au, as well as transition metals or relative metal oxides including Cu, Ni, Fe, or Co. Further, reducible metal oxides suitable for forming support structures for above-mentioned metals or metal oxides may include, but are not limited to, single metal oxides including ceria, iron oxide, manganese oxide, or copper oxide, as well as their mixed metal oxides including ceria-zirconia, copper-cerium oxide, or iron-cobalt oxide.

Some embodiments of the present disclosure are directed to methods for fabricating thermally-stable reducible metal oxide catalyst support structures on a base material using a multi-step incipient wetness impregnation (IWI) process. Additional embodiments of the present disclosure are directed to the metal or metal oxide catalysts fabricated using the methods disclosed herein.

It is recognized herein that catalytic support structures formed from reducible metal oxides on an irreducible base material (e.g., $Al_2O_3$, $SiO_2$, MgO, or $ZrO_2$, or the like) may provide high catalytic activity at relatively lower temperatures than support structures formed from an irreducible metal oxide alone. However, support structures fabricated using traditional techniques such as single-step IWI of a reducible metal oxide onto a base material have limited thermal stability. For example, aging catalysts with such support structures (e.g., through heating at temperatures in the range of 650-1050° C.) may result in a reduction of surface area of the support structures, migration of metal or metal oxide catalysts, and/or binding of some metal or metal oxide catalysts with the underlying base material.

It is recognized herein that the reducibility of a metal oxide may generally be related to conditions under which vacancies (e.g., oxygen or metal vacancies) are formed that may facilitate reduction reactions. For the purposes of the present disclosure, the terms reducible metal oxide and irreducible metal oxide are used to refer to metal oxides having a relatively high and relatively low capability to form oxygen vacancies under conditions associated with catalytic reactions, respectively. For example, in the context of the present disclosure, a reducible metal oxide may include, but is not limited to, $CeO_2$, $CeZrO_x$, or $Fe_2O_3$. By way of another example, in the context of the present disclosure, an irreducible metal oxide may include, but is not limited to, $Al_2O_3$, $SiO_2$, MgO, $ZrO_2$, $MgAl_2O_4$, or $La_2O_3$—$Al_2O_3$. By way of a further example, in the context of the present disclosure, a metal may include, but is not limited to, precious metals such as Pt, Pd, Rh, Ir, or Au or alloys of these or transition metals or relative metal oxides including Cu, Ni, Fe, or Co.

In some embodiments of the present disclosure, reducible metal oxide support structures having high surface area and high thermal stability are formed using a multi-step IWI process, where the support structure is generated through high-temperature calcination between IWI steps. For example, calcination between IWI steps may include, but is not limited to, heating at approximately 800° C. in an oxygen-rich environment. In this regard, a first IWI step of a reducible metal oxide on a base material followed by high-temperature calcination may facilitate a controlled surface-wide reaction of the reducible metal oxide with the base material. For example, IWI of $CeO_2$ on $Al_2O_3$ followed by high-temperature calcination may produce a surface layer of $CeAlO_3$ with excellent thermal stability. Subsequent IWI steps combined with low-temperature calcination (e.g., at 550° C.) may then provide a high-surface area reducible metal oxide layer with a desired concentration of the reducible metal oxide material. It is contemplated herein that this thermally stable support structure will resist migration of further loaded metals or metal oxides from the surface of a fully-formed catalyst device, even upon severe aging.

It is further contemplated herein that multi-step IWI with high-temperature calcination between IWI steps may be a flexible approach for fabricating thermally-stable support structures using a wide range of materials. For example, this approach is suitable for any type of reducible metal oxide material including, but not limited to single metal oxides such as ceria, iron oxide, manganese oxide, or copper oxide, as well as their mixed metal oxides including ceria-zirconia, copper-cerium oxide, or iron-cobalt oxide. By way of example, the base material may include any irreducible oxide such as, but not limited to, $Al_2O_3$, $SiO_2$, MgO, $ZrO_2$, $MgAl_2O_4$, or $La_2O_3$—$Al_2O_3$.

Additional embodiments of the present disclosure are directed to generating surface defects on reducible metal oxides to serve as anchoring sites for metal or metal oxide catalysts. It is recognized herein that many metal oxides suitable for low-temperature operation have relatively few naturally-occurring surface defects. Further, the activity and stability of metal or metal oxide catalysts is typically determined by the local coordination environment of the catalytically active metal or metal oxide sites. Surface defects of metal oxides have also been proven to be crucial for effectively anchoring metal or metal oxide atoms to achieve high activity and stability. However, the limited number of naturally-occurring metal oxide supports may practically limit the loading capacity of these materials in their natural state. However, traditional techniques for engineering surface defects on metal oxide supports such as the use of dopants as structural modifiers or exposing specific crystal planes (e.g., of $CeO_2$) require expensive raw materials (e.g. La, Y, Pr, Nd, Sm) or complex preparation procedures (e.g., hydrothermal synthesis).

In some embodiments of the present disclosure, surface defects of reducible oxide supports are generated using a gas reduction process. In particular, the gas reduction process may generate surface defects through the consumption of lattice oxygen. For example, reducible metal oxide supports such as, but not limited to, ceria, iron oxide, manganese oxide, copper oxide, ceria-zirconia, copper-cerium oxide, iron-cobalt oxide or the like may be reduced with a flow of a gas-phase reactant (e.g., $H_2$, CO, or the like) at a sufficient temperature to generate surface defects distributed across the support surface. These engineered surface defects may be stable at room temperature even under atmospheric conditions and may thus serve as thermally stable anchor sites for loaded metals or metal oxides. Further, precious metals or base metals/metal oxides anchored to these engineered surface defects exhibit high catalytic activity and provide high catalytic performance. Accordingly, generating defects through a gas reduction process as disclosed herein may be a relatively low-cost and scalable process suitable for a wide range of materials.

Referring now generally to FIGS. 1-9B, systems and methods for fabricating a metal oxide catalyst support using multi-step IWI is described in greater detail in accordance with one or more embodiments of the present disclosure. FIG. 1 is a block diagram of a method 100 for fabricating a metal oxide support for a catalyst structure using multi-step IWI in accordance with one or more embodiments of the present disclosure. FIGS. 2A through 3F depict the fabrication of precious metal catalysts including catalyst support structures formed from a metal oxide (e.g., a reducible metal oxide) on a base structure using various techniques, as well as metal catalysts based on the catalyst support structures. FIGS. 2A-2D depict fabrication of a catalyst 202 including a single-step IWI support structure 204 using a typical single-step IWI process in accordance with one or more embodiments of the present disclosure. FIGS. 3A-3F depict the fabrication of a catalyst 302 including a multi-step IWI support structure 304 using the multi-step IWI method 100 in accordance with one or more embodiments of the present disclosure.

For the purposes of illustration, the single-step IWI support structure 204 in FIGS. 2A-2D and the multi-step IWI support structure 304 in FIGS. 3A-3F are formed using the same total amount of a reducible metal oxide on an irreducible metal oxide base structure. In this regard, differences in performance between the resulting catalysts may be attributable to differences in the fabrication of the support structures.

Figure 2A:
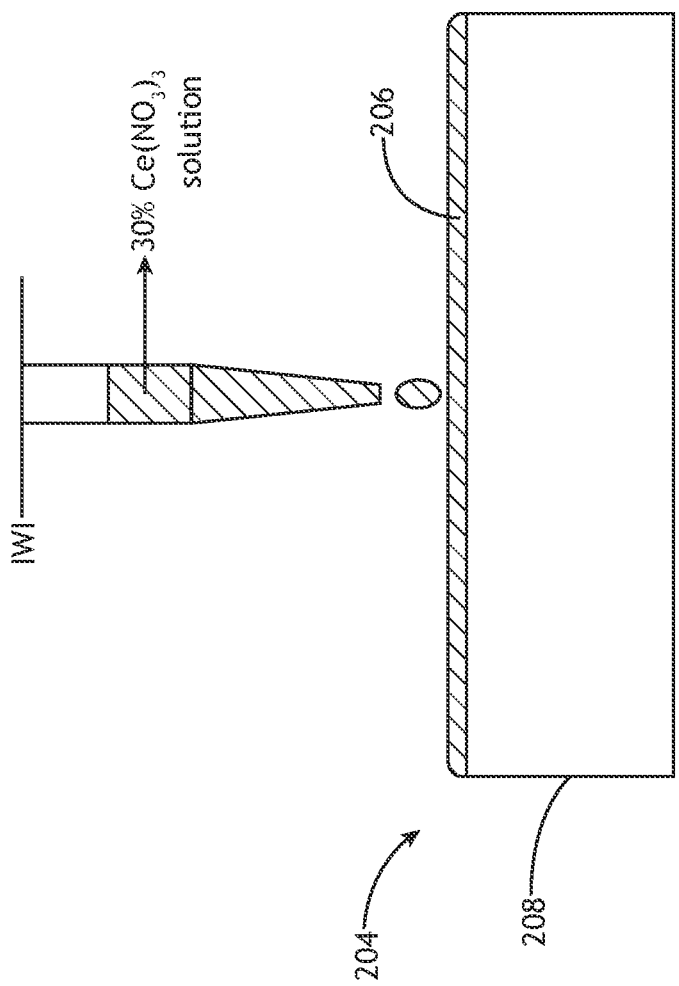
FIG. 2A is a diagrammatic view of a single-step IWI support structure after deposition of a metal oxide onto a base material in accordance with one or more embodiments of the present disclosure.
Figure 2B:
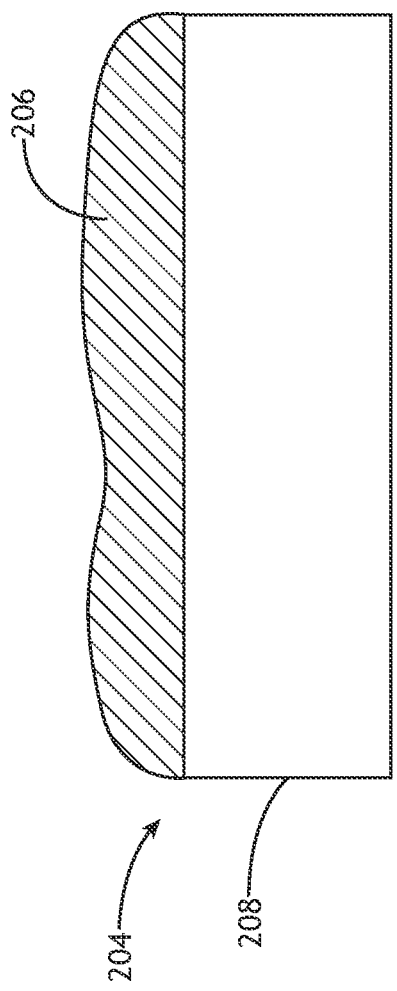
FIG. 2B is a diagrammatic view of the single-step IWI support structure after a calcination step in accordance with one or more embodiments of the present disclosure.

FIG. 2A is a diagrammatic view of a single-step IWI support structure 204 after deposition of a metal oxide 206 onto a base material 208 in accordance with one or more embodiments of the present disclosure. In FIG. 2A, a precursor solution including 30 weight-% (wt. %) of the metal oxide 206 (e.g., a reducible metal oxide) is loaded onto the base material 208 (e.g., an irreducible metal oxide) using a single-step IWI process. For example, FIG. 2A may illustrate a precursor solution including cerium-containing precursors (e.g., cerium nitrate, ammonium cerium nitrate, cerium(III) sulfate, cerium chloride, or the like) deposited on a base material 306 of $Al_2O_3$, which may be suitable for forming $CeO_2/Al_2O_3$ single-step IWI support structure 204. FIG. 2B is a diagrammatic view of the single-step IWI support structure 204 after a calcination step in accordance with one or more embodiments of the present disclosure. For example, FIG. 2B may illustrate the catalyst 202 after heating at 550° C. to stabilize the ceria on the surface of the aluminum oxide.

Figure 2D:
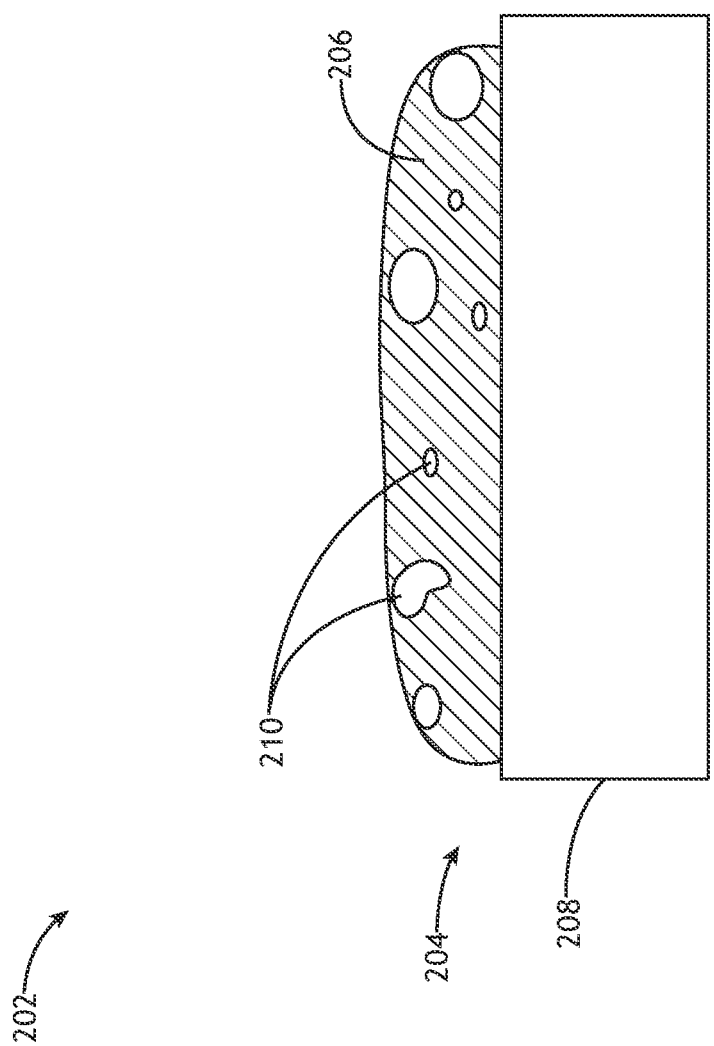
FIG. 2D is a diagrammatic view of the catalyst after aging and a subsequent reduction activation step in accordance with one or more embodiments of the present disclosure.

FIG. 2C is a diagrammatic view of a precious metal catalyst 202 after deposition (e.g., loading) of precious metals 210 on the single-step IWI support structure 204 and a second calcination process to stabilize the full catalyst 202 in accordance with one or more embodiments of the present disclosure. For example, FIG. 2C may illustrate the catalyst 202 after heating at 550° C. FIG. 2D is a diagrammatic view of the catalyst 202 after aging and a subsequent reduction activation step in accordance with one or more embodiments of the present disclosure. For example, FIG. 2D may illustrate the catalyst 202 after heating at 800° C., which may be followed by a reduction activation step such as heating in a 10% $H_2$/Ar atmosphere at 400° C.

It is contemplated herein that catalysts including support structures of a reducible metal oxide on an irreducible metal oxide base structure formed using a single-step IWI process as illustrated in FIGS. 2A-2D may degrade upon aging, which may limit the lifespan of the catalysts. For example, as illustrated in FIG. 2D, some of the precious metals 210 may form large clusters, diffuse, or otherwise migrate from the surface of the metal oxide 206 with aging. Further, some of the precious metals 210 may migrate to and bind with the underlying base material 208. As a result, the catalytic activity of the catalyst 202 may reduce upon aging.

Referring now again to FIGS. 1 and 3A-3F, the fabrication of catalyst support structures with a multi-step IWI process is described in accordance with one or more embodiments of the present disclosure. It is contemplated herein that a catalyst support structure formed in accordance with the techniques disclosed herein (e.g., a multi-step IWI support structure 304) may exhibit substantially different chemical and physical properties than catalytic support structures formed using a single-step IWI process (e.g., a single-step IWI support structure 204), even if the total amounts of the associated materials are the same. In particular, a catalyst support structure formed in accordance with the techniques disclosed herein may exhibit substantially better performance upon aging.

In one embodiment, the method 100 includes a step 102 of receiving a base material 306. The base material 306 may include any material suitable for providing structural, chemical, and/or thermal support for the catalyst 302. Further, the base material 306 may be inert or may be active with respect to any catalytic reactions. In some embodiments, the base material 306 is an irreducible metal oxide such as, but not limited to $Al_2O_3$, $SiO_2$, MgO, or $ZrO_2$. An irreducible metal oxide may provide high thermal and/or chemical stability in the expected operational conditions of exhaust catalysis. For example, support structures formed from $CeO_2$ loaded onto $Al_2O_3$ as a base material have been shown to have better low-temperature catalytic activity and thermal stability than bulk $CeO_2$ alone as a support structure. In this regard, both the thermal stability of the $Al_2O_3$ base material and the catalytic activity of the $CeO_2$ may be exploited. However, it is to be understood that any base material suitable for use as a support in a catalysis structure is within the spirit and scope of the present disclosure. For example, the base material 306 may include, but is not limited to, perovskite-type oxide materials or zeolites. Further, the base material 306 may generally be formed from any number of materials. In some embodiments, the base material 306 is formed as a mixed oxide support and may include two or more materials including, but not limited to, two or more irreducible oxides.

In another embodiment, the method 100 includes a step 104 of loading a first concentration of metal oxide 308 onto the base material 306. In this way, the metal oxide 308 and the base material 306 form an early-stage version of a multi-step IWI support structure 304. For example, the step 104 may be, but is not required to be, performed using IWI. The metal oxide 308 may include any type of metal oxide suitable for use as a support in a catalyst structure. In some embodiments, the metal oxide 308 includes a reducible metal oxide. For example, the reducible metal oxide may include ceria, iron oxide, manganese oxide, copper oxide, ceria-zirconia, copper-cerium oxide, or iron-cobalt oxide. As described previously herein, reducible metal oxides may operate well as support materials for metal or metal oxide catalysts, particularly for low-temperature operation (e.g., at or below 150° C.). However, it is to be understood any metal oxide suitable for use as a support in a catalysis structure is within the spirit and scope of the present disclosure. In a general sense, the base material and the metal oxide may be selected to include any combination of materials known in the art suitable for use in catalysis. Further, the base material 306 and the metal oxide 308 may be selected to provide desired structural and/or chemical properties.

Figure 3A:
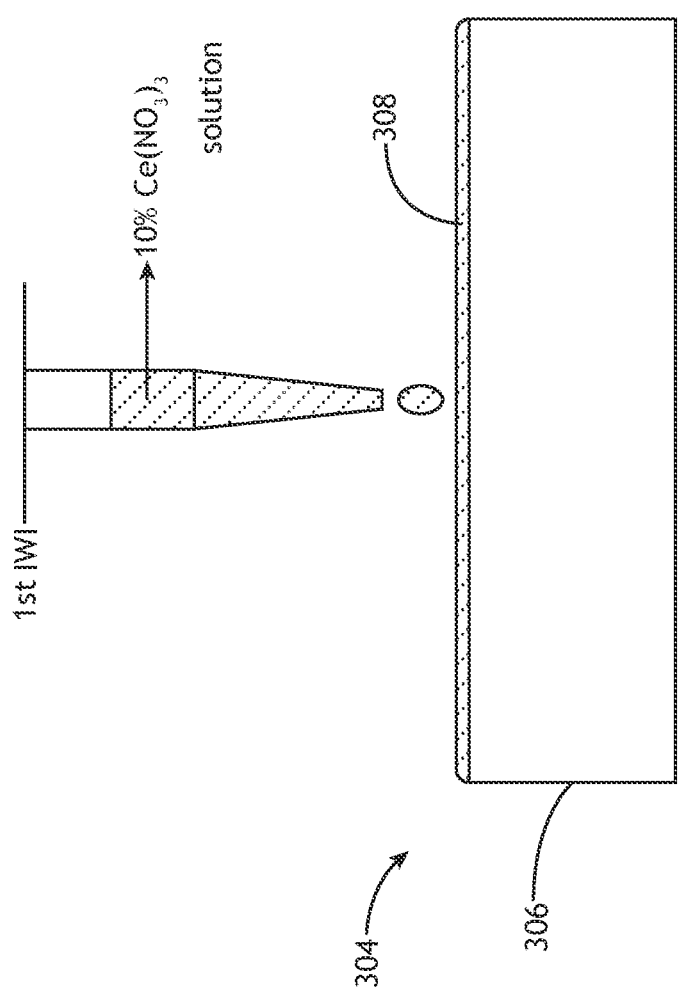
FIG. 3A is a diagrammatic view of the catalyst after deposition of a first concentration of the metal oxide onto a base material in accordance with one or more embodiments of the present disclosure.

FIG. 3A is a diagrammatic view of the catalyst 302 after deposition of a first concentration of the metal oxide 308 onto a base material 306 in accordance with one or more embodiments of the present disclosure. In particular, FIG. 3A depicts the loading of a precursor solution including 10 wt. % of the metal oxide 308 (e.g., a reducible metal oxide) onto the base material 306 (e.g., an irreducible metal oxide) in a first IWI step. For example, FIG. 3A may illustrate a precursor solution including cerium-containing precursors (e.g., cerium nitrate, ammonium cerium nitrate, cerium(III) sulfate, cerium chloride, or the like) deposited on a base material 306 of $Al_2O_3$, which may be suitable for forming $CeO_2/Al_2O_3$ multi-step IWI support structure 304. Further, in FIG. 3A, the metal oxide 308 is illustrated as a uniform layer. However, it is to be understood that FIG. 3A is provided for illustrative purposes and should not be interpreted as limiting. Rather, the metal oxide 308 may be deposited in a uniform or non-uniform layer on the base material 306.

In another embodiment, the method 100 includes a step 106 of performing a first calcination process on the multi-step IWI support structure 304. The first calcination process in step 106 may include heating the multi-step IWI support structure 304 under any conditions suitable for stabilizing and/or increasing the dispersion of metal oxide 308 on the base material 306 and/or enhancing interaction between metal oxide 308 on the base material 306. In some embodiments, the step 106 includes heating the multi-step IWI support structure 304 in an atmosphere including oxygen (e.g., standard atmosphere, an oxygen-enriched atmosphere, or the like) or reductive gas (e.g., $H_2$, CO, or the like) to generate mixed oxide species at interface between metal oxide 308 on the base material 306. As an illustrative example, stable $CeAlO_3$ species may be generated at an interface between ceria (e.g., multi-step IWI support structure 304) and $Al_2O_3$ (e.g., base material 306) by heating the multi-step IWI support structure 304 in air at 800° C. Further, it is recognized herein that the temperature and duration of the calcination in step 106 may be adjusted based on the specific materials used for the metal oxide 308 and/or the base material 306. In some embodiments, the calcination in step 106 includes heating at temperatures greater than 550° C. For example, the calcination in step 106 may include heating a temperature in the range of 550 to 1050° C. By way of another example, the calcination in step 106 may include heating at a temperature around 800° C., which is similar to industry-accepted aging procedures. In a general sense, the first calcination process in step 106 may include heating for any duration such as, but not limited to, at least one hour.

Figure 3B:
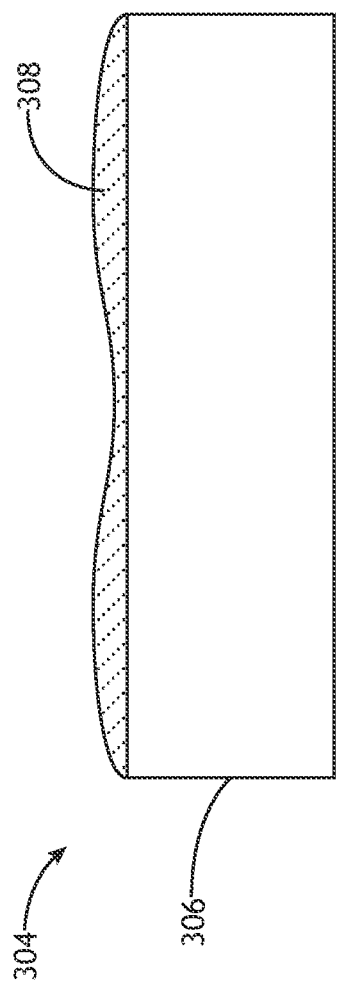
FIG. 3B is a diagrammatic view of the catalyst after the first calcination process in accordance with one or more embodiments of the present disclosure.

FIG. 3B is a diagrammatic view of the catalyst 302 after the first calcination process in step 106 in accordance with one or more embodiments of the present disclosure. As illustrated in FIG. 3B, the first calcination process in step 106 may decompose the precursor material from step 104 and leave behind stable structures of the metal oxide 308 (here illustrated as mounds). However, it is to be understood that FIG. 3B is provided for illustrative purposes and should not be interpreted as limiting. Rather, it is contemplated herein that the metal oxide 308 after the first calcination process in step 104 may have a variety of structures including, but not limited to, a thin film or a thick film. Further, as illustrated in FIG. 3B, the metal oxide 308 may be, but is not required to be, distributed as a non-uniform structure or a distribution of separate structures. For example, the calcination in step 106 may induce diffusion, coalescing, sintering, or the like to produce a non-uniform distribution of the metal oxide 308. In a general sense, the specific structure of the metal oxide 308 after the first calcination process in step 106 may depend on the selected conditions for step 106 such as, but not limited to, the temperature and duration of the heating.

In another embodiment, the method 100 includes a step 108 of loading a second concentration of the metal oxide 308 onto the multi-step IWI support structure 304 using IWI (e.g., as a second IWI step). The second concentration of the metal oxide 308 may fully or partially cover the first concentration of the metal oxide 308. In this way, an additional layer of the metal oxide 308 may be added to the stabilized layer of the metal oxide 308 from step 106.

For the purposes of the present disclosure, the terminology of loading the second concentration of the metal oxide 308 onto the multi-step IWI support structure 304 is used to describe loading the second concentration of the metal oxide 308 as a layer on the existing layers of the multi-step IWI support structure 304. The second concentration of the metal oxide 308 may thus be in contact with any previous layers of the multi-step IWI support structure 304 including, but not limited to, the metal oxide 308 from the first deposition in step 104 and calcinated in step 106 and/or the base material 306. Accordingly, it is to be understood that the terminology of loading the second concentration of the metal oxide 308 onto the multi-step IWI support structure 304 may include, but does not require, contact between the second concentration of metal oxide 308 loaded in step 108 and the base material 306 itself. Rather, in cases where the metal oxide 308 loaded in step 104 and calcinated in step 106 covers surface of the base material 306, the metal oxide 308 loaded in step 108 may only contact the metal oxide 308 in the previous layer (e.g., loaded in step 104).

Figure 3C:
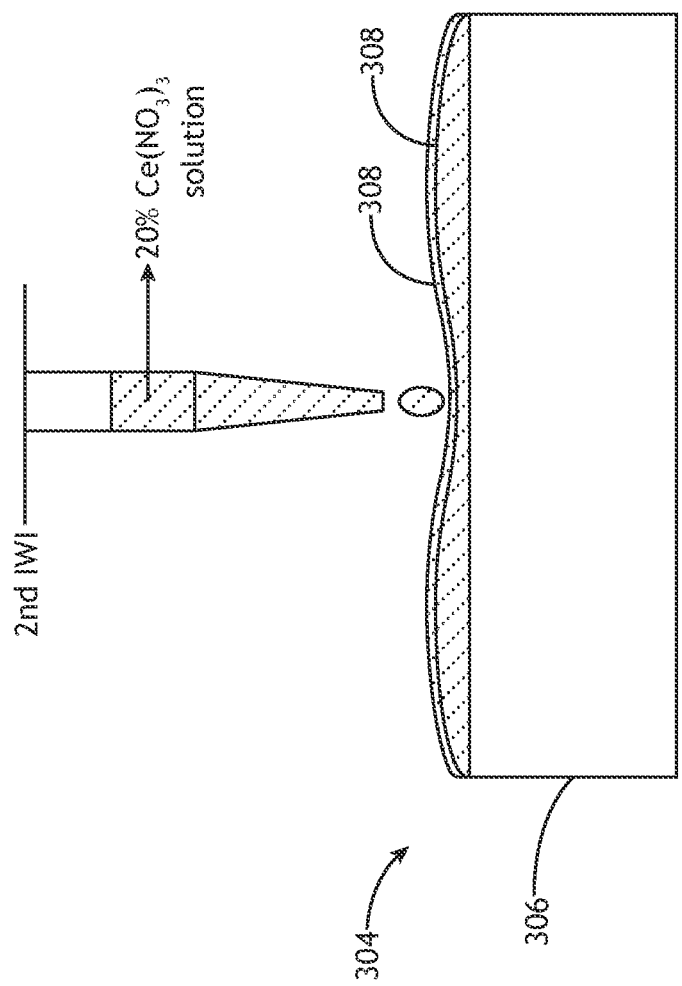
FIG. 3C is a diagrammatic view of the catalyst after deposition of a second concentration of the metal oxide onto the base material in accordance with one or more embodiments of the present disclosure.

FIG. 3C is a diagrammatic view of the catalyst 302 after deposition of a second concentration of the metal oxide 308 onto the base material 306 in accordance with one or more embodiments of the present disclosure. In particular, FIG. 3C depicts the loading of a precursor solution including 20 wt. % of the metal oxide 308 (e.g., a reducible metal oxide) onto the base material 306 (e.g., an irreducible metal oxide) in a second IWI step. For example, in a manner similar to FIG. 3A, FIG. 3C may illustrate a precursor solution including cerium-containing precursors (e.g., cerium nitrate, ammonium cerium nitrate, cerium(III) sulfate, cerium chloride, or the like) deposited on a base material 306 of $Al_2O_3$, which may be suitable for forming the $CeO_2/Al_2O_3$ multi-step IWI support structure 304.

In one embodiment, the metal oxide 308 loaded in step 108 is the same material as the metal oxide 308 loaded in step 104. Accordingly, the multi-step IWI support structure 304 may include the same amount of metal oxide 308 as the single-step IWI support structure 204 illustrated in FIGS. 2A-2D, but deposited in smaller concentrations in multiple steps. Further, the order in which different amounts of the metal oxide 0.08 are deposited may vary. For example, the amount of metal oxide 308 loaded in step 104 may be lower than the amount of metal oxide 308 loaded in step 108 (e.g., the concentration of the metal oxide 308 in a precursor solution is lower for step 104 than for step 108). By way of another example, the amount of metal oxide 308 loaded in step 104 may be higher than the amount of metal oxide 308 loaded in step 108 (e.g., the concentration of the metal oxide 308 in a precursor solution is higher for step 104 than for step 108). In another embodiment, the amount of metal oxide 308 deposited by steps 104 and 108 are equal (e.g., the concentrations of the metal oxide 308 in precursor solutions are equal). In another embodiment, the metal oxide 308 loaded in step 108 is a different material than the metal oxide 308 loaded in step 104. In this regard, the multi-step IWI support structure 304 may be formed as a non-homogenous combination of multiple materials.

Further, in FIG. 3C, the metal oxide 308 is illustrated as a uniform layer. However, it is to be understood that FIG. 3C is provided for illustrative purposes and should not be interpreted as limiting. Rather, the metal oxide 308 may be deposited in a uniform or non-uniform layer on the base material 306.

In another embodiment, the method 100 includes a step 110 of performing a second calcination process on the multi-step IWI support structure 304. The second calcination process in step 110 may include heating the multi-step IWI support structure 304 under any conditions suitable for stabilizing the metal oxide 308 from the second loading step 108 and/or increasing the catalytic activity of the finalized catalyst 302. In some embodiments, the step 110 includes heating the multi-step IWI support structure 304 in an atmosphere including oxygen (e.g., standard atmosphere, an oxygen-enriched atmosphere, or the like) for forming stable metal oxide 308. Further, it is recognized herein that the temperature and duration of the calcination in step 110 may be adjusted based on the specific materials used for the metal oxide 308 and/or the base material 306. In some embodiments, the calcination in step 110 includes heating at temperatures greater than 350° C. For example, the calcination in step 106 may include heating a temperature in the range of 350 to 1050° C. By way of another example, the calcination in step 110 may include heating at a temperature around 550° C., which is similar to industry-accepted calcination procedures. In a general sense, the second calcination process in step 110 may include heating for any duration such as, but not limited to, at least one hour.

Figure 3D:
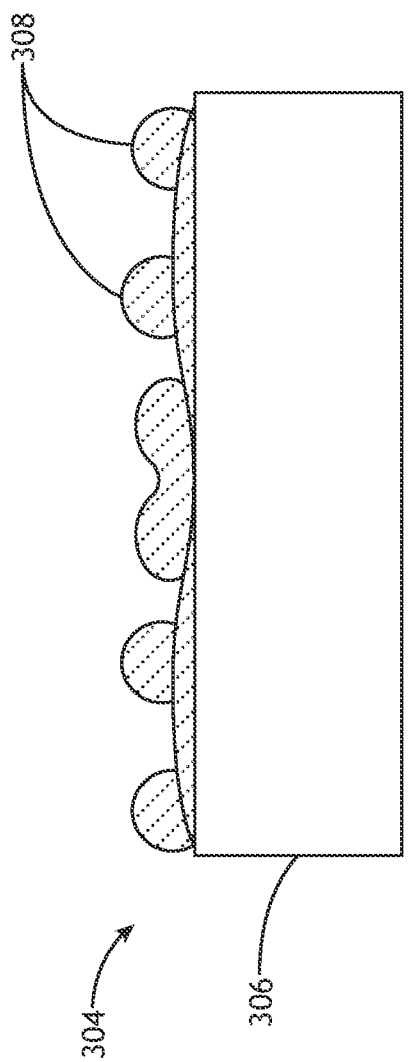
FIG. 3D is a diagrammatic view of the multi-step IWI support structure after the second calcination process in accordance one with or more embodiments of the present disclosure.

FIG. 3D is a diagrammatic view of the multi-step IWI support structure 304 after the second calcination process in step 108 in accordance one with or more embodiments of the present disclosure. As illustrated in FIG. 3D, the second calcination process in step 110 may decompose the precursor material from step 108 and leave behind a stable structure of the metal oxide 308.

Further, the calcination in step 110 may induce diffusion, coalescing, sintering, or the like of the metal oxide 308 deposited in step 108 to produce a non-uniform distribution of the metal oxide 308. For example, FIG. 3D illustrates a non-uniform structure of the metal oxide 308 having features with multiple size scales associated with the different IWI and calcination steps. For example, the first IWI and calcination steps (e.g., steps 104 and 106) associated with a relatively low concentration of the metal oxide 308 may generate a first set of structures of the metal oxide 308 on the surface of the base material 306. Due to the nature of the interaction of the metal oxide 308 with the base material 306, this first set of surface structures may be, but are not required to be, relatively flat and spread across the surface of the base material 306. The second IWI and calcination steps (e.g., steps 108 and 110) associated with a relatively higher concentration of the metal oxide 308 may generate a second set of structures of the metal oxide 308 that are also thermally stable and resistant to degradation upon aging. In this case, the nature of the interaction of newly deposited metal oxide 308 with the stabilized previous layer may induce the formation of smaller structures of the metal oxide 308. As a result, the multi-step IWI support structure 304 after the calcination in step 110 may have a relatively higher surface area of the metal oxide 308 than formed using a single IWI step with the same total amount of the metal oxide 308 (see e.g., FIG. 2C contrasted with FIG. 3D).

However, it is to be understood that FIG. 3B is provided for illustrative purposes and should not be interpreted as limiting. Rather, it is contemplated herein that the metal oxide 308 after the first calcination process in step 104 may have a variety of structures. In a general sense, the specific structure of the metal oxide 308 after the first calcination process in step 106 may depend on the selected conditions for step 106 such as, but not limited to, the temperature and duration of the heating.

It is additionally contemplated herein that the conditions associated with the calcination in the step 106 may be, but are not required to be, different than the conditions associated with the calcination in the step 110. In particular, the differences may be associated with differences in the desired result. For example, the calcination in step 106 after the first IWI process in step 104 may be adjusted to include a relatively hotter temperature and/or a longer heating time than the calcination in the step 110 in order to ensure that the generated layer of the metal oxide 308 is sufficiently stable throughout any subsequent calcination steps. In contrast, the calcination in step 110 may be intended to stabilize the multi-step IWI support structure 304 prior to loading of a precious metal 310, which may require relatively lower temperatures and/or shorter heating durations. As a non-limiting illustration, the calcination in step 106 may include heating at a temperature of 800° C., whereas the calcination in step 110 may include heating at a temperature of 550° C. In this regard, the step 106 may be, but is not required to be, characterized as a high-temperature calcination step and the step 110 may be, but is not required to be, characterized as a low-temperature calcination step.

In another embodiment, although not shown, the method 100 includes one or more additional IWI and calcination steps for the formation of additional layers of the metal oxide 308 on the multi-step IWI support structure 304. For example, the additional calcination steps may be substantially similar to the calcination step 106. As described above, this calcination step 106 and the additional calcination steps after IWI depositions may be, but are not required to be, characterized as high-temperature calcination steps relative to the calcination in step 110.

It is further contemplated herein that loading the metal oxide 308 onto the base material 306 using multiple IWI steps with high-temperature calcination between IWI steps may provide a support structure with high thermal stability, even after aging. Additionally, multi-step IWI as described herein may promote high surface area of the metal oxide 308 (see e.g., see FIG. 3C), which may facilitate high loading of a precious metal 310 or other metal material onto the multi-step IWI support structure 304 to form a final catalyst 302. In this regard, overall catalytic performance may be improved by loading a given concentration of metal oxide 308 onto a base material 306 using multi-step IWI as described herein instead of using a single IWI step.

In some embodiments, a metal or metal oxide catalyst 302 may be formed using the support structures generated using the method 100. In another embodiment, the method 100 includes a step 112 of loading a catalyst material 310 (e.g., precious metal, transition metal, metal oxide or the like), base metals or metal oxides (or precursor materials including such metals) onto the multi-step IWI support structure 304 to form a catalyst 302. For example, a precursor material with a selected concentration of the catalyst material 310 may be deposited onto the multi-step IWI support structure 304 using IWI. Further, as will be described in greater detail below, the method 100 may further include reducing the multi-step IWI support structure 304 with a gas-phase reducing agent to generate a plurality of defect sites on a surface of the multi-step IWI support structure 304 prior to loading the multi-step IWI support structure 304 with the catalyst material 310. In this regard, the reduction step may facilitate the attachment of the catalyst material 310 to the defect sites to provide a catalyst 302 with high activity and thermal stability.

In another embodiment, the method 100 includes a step 114 of performing a third calcination process on the catalyst 302. The third calcination process in step 114 may include heating the catalyst 302 under any conditions suitable for stabilizing the catalyst 302 and/or increasing the catalytic activity of the finalized catalyst 302. In some embodiments, the step 114 includes heating the catalyst 302 in an atmosphere including oxygen (e.g., standard atmosphere, an oxygen-enriched atmosphere, or the like) or a reductive gas (e.g., $H_2$, CO, or the like). Further, it is recognized herein that the temperature and duration of the calcination in step 114 may be adjusted based on the specific materials used for the metal oxide 308 and/or the base material 306. In some embodiments, the calcination in step 114 includes heating at temperatures greater than 350° C. For example, the calcination in step 114 may include heating a temperature in the range of 350 to 1050° C. By way of another example, the calcination in step 114 may include heating at a temperature around 550° C., which is similar to industry-accepted calcination procedures. In a general sense, the third calcination process in step 114 may include heating for any duration such as, but not limited to, at least one hour. Further, the catalyst 302 may be aged as described previously herein (e.g., by heating at a temperature of 800° C. or another suitable aging process).

Figure 3E:
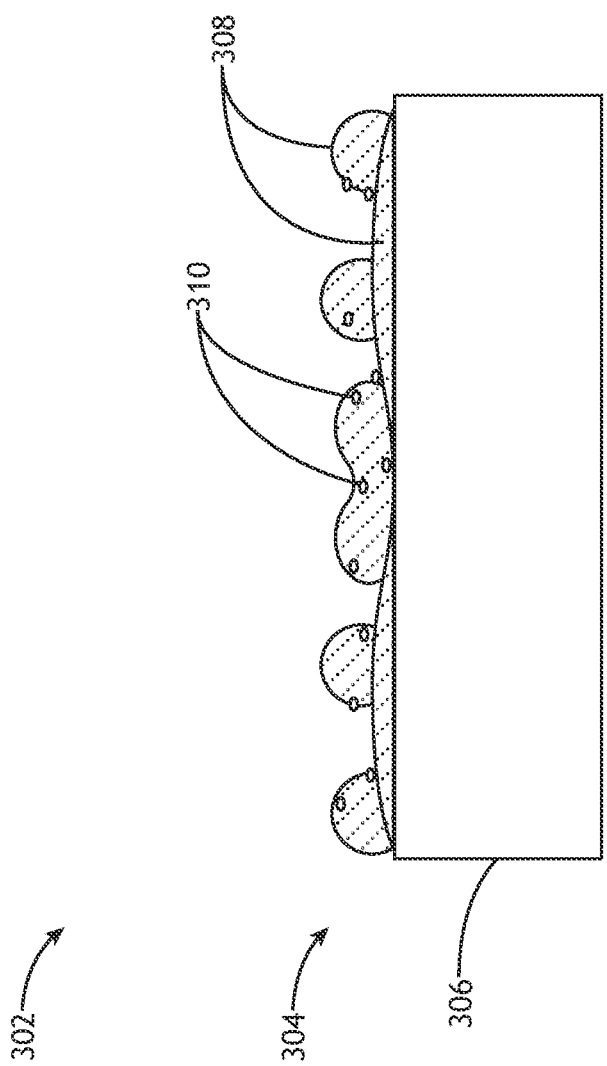
FIG. 3E is a diagrammatic view of a catalyst after deposition of precious metal onto the multi-step IWI support structure and a third calcination process in accordance with one or more embodiments of the present disclosure.
Figure 3F:
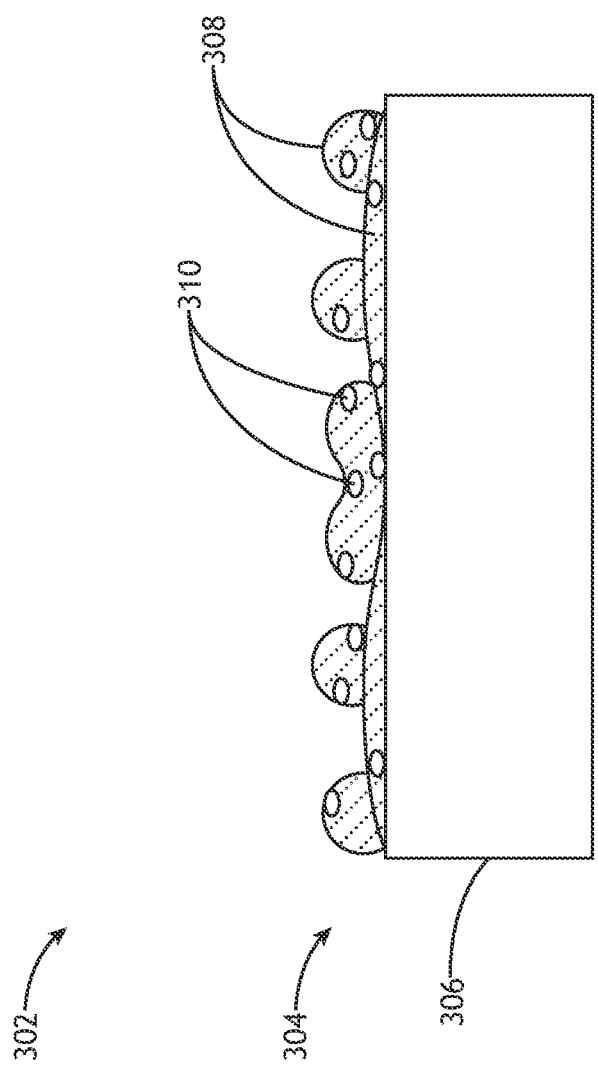
FIG. 3F is a diagrammatic view of the catalyst in FIG. 3E after aging and a subsequent reduction activation process in accordance with one or more embodiments of the present disclosure.

FIGS. 3E and 3F illustrate the formation and aging of a metal catalyst 302 based on the multi-step IWI support structure 304 fabricated based on the method 100 in accordance with one or more embodiments of the present disclosure. FIG. 3E is a diagrammatic view of a catalyst 302 after deposition of metal 310 onto the multi-step IWI support structure 304 and a third calcination process (e.g., to stabilize a final catalyst) in accordance with one or more embodiments of the present disclosure. For example, a precursor solution including a selected concentration of the precious metal 310 may be deposited onto the multi-step IWI support structure 304 using an IWI process. FIG. 3F is a diagrammatic view of the catalyst 302 in FIG. 3E after aging and a subsequent reduction activation process with one or more embodiments of the present disclosure. For example, FIG. 3F may illustrate the catalyst 302 after simulated aging at 800° C. in accordance with industry standards, which may be followed by a reduction activation step such as, but not limited to, heating in a 10% $H_2$/Ar atmosphere at 400° C. By way of another example, FIG. 3F may illustrate the catalyst 302 after natural aging associated with operational use in a field environment. As illustrated in FIG. 3F, the highly-stabilized multi-step IWI support structure 304 supports resist clustering or diffusion of the precious metal 310 in the catalyst 302. As a result, the fully-formed catalyst 302 may provide high catalytic activity at low temperatures as well as high thermal stability to provide a long operational lifetime.

It is to be understood however that the description of precious metal catalysts including $CeO_2/Al_2O_3$ support structures in FIGS. 3A-3F is provided solely for illustrative purposes and should not be interpreted as limiting. Rather, catalysts including, but not limited to, base metals or metal oxides are within the spirit and scope of the present disclosure.

Referring now to FIGS. 4-7, the performance of platinum catalysts with $CeO_2/Al_2O_3$ support structures (1 wt. % Pt/30 wt. % $CeO_2/Al_2O_3$) formed under different conditions is described. Further, each catalyst was pre-treated in 10% $H_2$/Ar flow at 400° C. for 1 h prior to the test. In particular, FIGS. 4-7 illustrate the performance of 1 wt. % Pt/30 wt. % $CeO_2/Al_2O_3$ catalyst structures.

Catalyst 1 may correspond to the catalyst 302 including the multi-step IWI support structure 304 fabricated in accordance with method 100. For example, catalyst 1 is formed using a two-step IWI technique in accordance with method 100. In particular, catalyst 1 was formed using the following steps:

1. IWI (e.g., step 104) of $Ce(NO_3)_3$ onto $\gamma$-$Al_2O_3$ followed by calcination (e.g., step 106) at 800° ° C. for 2 h to form 10 wt. % $CeO_2/Al_2O_3$ (multi-step IWI support structure 304).
2. IWI (e.g., step 108) of $Ce(NO_3)_3$ (20 wt. % $CeO_2$) onto 10 wt. % $CeO_2/Al_2O_3$, followed by calcination (e.g., step 110) at 550° C. for 2 h to form 30 wt. % $CeO_2/Al_2O_3$ (multi-step IWI support structure 304).
3. IWI (e.g., step 112) of Pt precursor onto the 30 wt. % $CeO_2/Al_2O_3$ multi-step IWI support structure 304, followed by calcination (e.g., step 114) at 550° C. for 2 h to form 1 wt. % Pt/30 wt. % $CeO_2/Al_2O_3$ catalyst structure (catalyst 302).

Reference catalyst 1 was formed using a single-step IWI process using the following steps:

1. IWI of $Ce(NO_3)_3$ onto $\gamma$-$Al_2O_3$ followed by calcination at 550° C. for 2 h to form 30 wt. % $CeO_2/Al_2O_3$.
2. IWI of Pt precursor onto 30 wt. % $CeO_2/Al_2O_3$ support, followed by calcination at 550° C. for 2 h to form 1 wt. % Pt/30 wt. % $CeO_2/Al_2O_3$.

Reference catalyst 2 was formed using a single-step IWI process:

1. IWI of $Ce(NO_3)_3$ onto $\gamma$-$Al_2O_3$ followed by calcination at 800° C. for 2 h to form 30 wt. % $CeO_2/Al_2O_3$—H.
2. IWI of Pt precursor onto a 30 wt. % $CeO_2/Al_2O_3$ support, followed by calcination at 550° C. for 2 h to form 1 wt. % Pt/30 wt. % $CeO_2/Al_2O_3$—H.

Figures 4, 5:
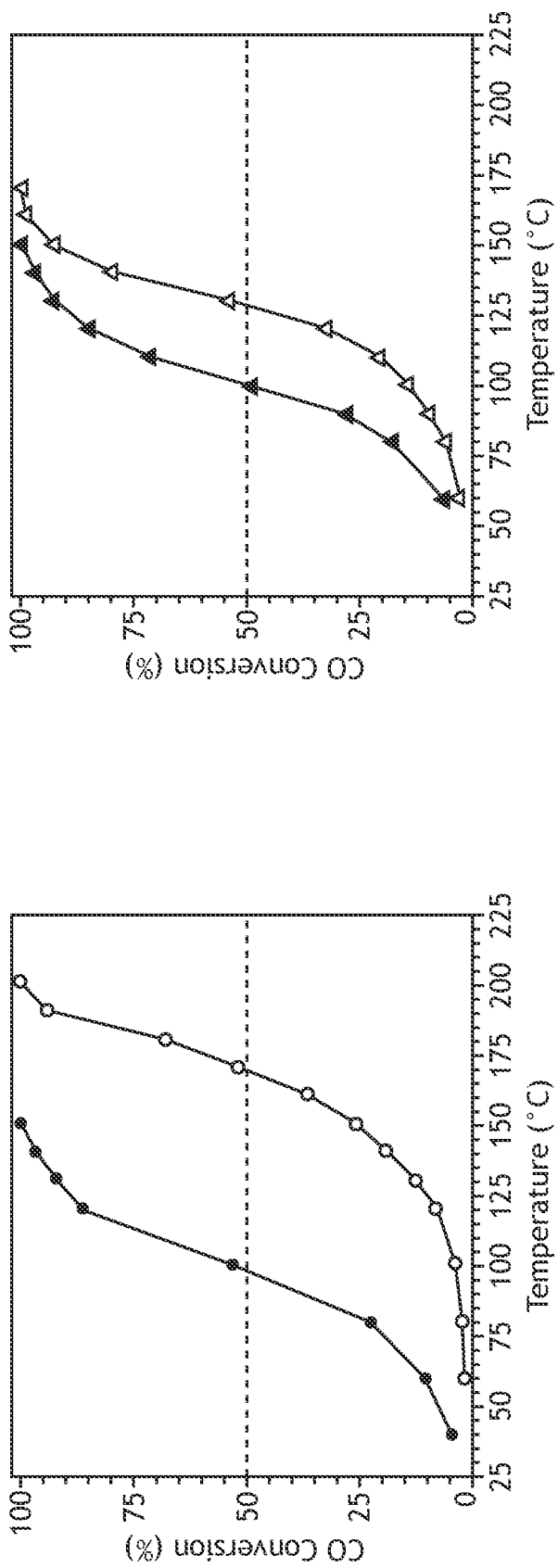
FIG. 4 is a plot illustrating the catalytic CO oxidation performance of reference catalyst 1 before and after aging in a standard air atmosphere at 800° C. for 12 hours, in accordance with one or more embodiments of the present disclosure.
FIG. 5 is a plot illustrating the catalytic CO oxidation performance of reference catalyst 2 before and after aging in a standard air atmosphere at 800° C. for 12 hours, in accordance with one or more embodiments of the present disclosure.

FIG. 4 is a plot illustrating the catalytic CO oxidation performance of reference catalyst 1 before and after aging in a standard air atmosphere at 800° C. for 12 hours, in accordance with one or more embodiments of the present disclosure. Reference catalyst 1 exhibited a significant decrease in CO oxidation activity upon aging at these conditions. Accordingly, the technique used to fabricate reference catalyst 1 provides an unstable structure under these aging conditions.

FIG. 5 is a plot illustrating the catalytic CO oxidation performance of reference catalyst 2 before and after aging in a standard air atmosphere at 800° C. for 12 hours, in accordance with one or more embodiments of the present disclosure. While not as severe as reference catalyst 1, reference catalyst 2 also exhibited a significant decrease in CO oxidation activity upon aging at these conditions. Accordingly, the technique used to fabricate reference catalyst 2 provides a relatively unstable structure under these aging conditions.

Figure 6:
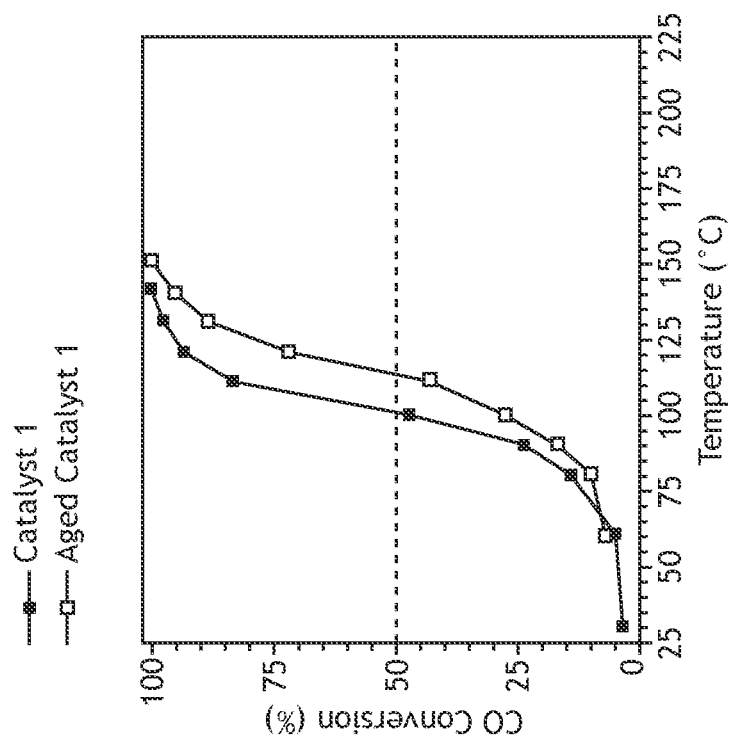
FIG. 6 is a plot illustrating the catalytic CO oxidation performance of catalyst 1 before and after aging in a standard air atmosphere at 800° C. for 12 hours, in accordance with one or more embodiments of the present disclosure.

FIG. 6 is a plot illustrating the catalytic CO oxidation performance of catalyst 1 before and after aging in a standard air atmosphere at 800° C. for 12 hours, in accordance with one or more embodiments of the present disclosure. The catalytic performance for a steady-state CO oxidation reaction was then analyzed. Only a slight drop in CO oxidation activity was observed upon aging at these severe conditions, which suggests that this catalyst generated by the multi-step IWI technique as described herein has excellent thermal stability.

Figure 7:
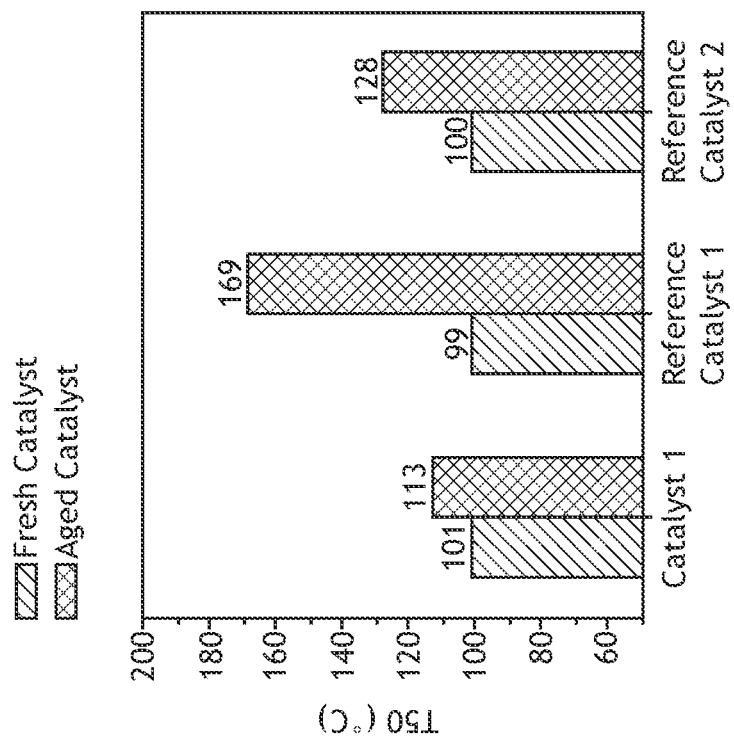
FIG. 7 is a bar chart of T50 for the catalysts before and after aging, in accordance with one or more embodiments of the present disclosure.

FIG. 7 is a bar chart of T50 for the catalysts before and after aging, in accordance with one or more embodiments of the present disclosure. T50 is the temperature at which CO conversion achieved 50%. Accordingly, the T50 provides a metric of the performance of each catalyst in low-temperature environments. As illustrated in FIG. 7, the fresh catalysts obtained by different methods having the same compositions showed very similar T50 for CO oxidation. However, the catalysts exhibited significant differences in performance after aging 800° C. for 12 hours. In particular, aging under these conditions resulted in only a 12° C. increase of T50 for Catalyst 1, whereas the T50 for reference catalysts 1 and 2 increased by 70° C. and 28° C., respectively, under the same aging conditions. Accordingly, the multi-step IWI fabrication technique as described herein may provide thermally stable catalysts suitable for low-temperature operation over the lifetime of the device.

Figure 8B:
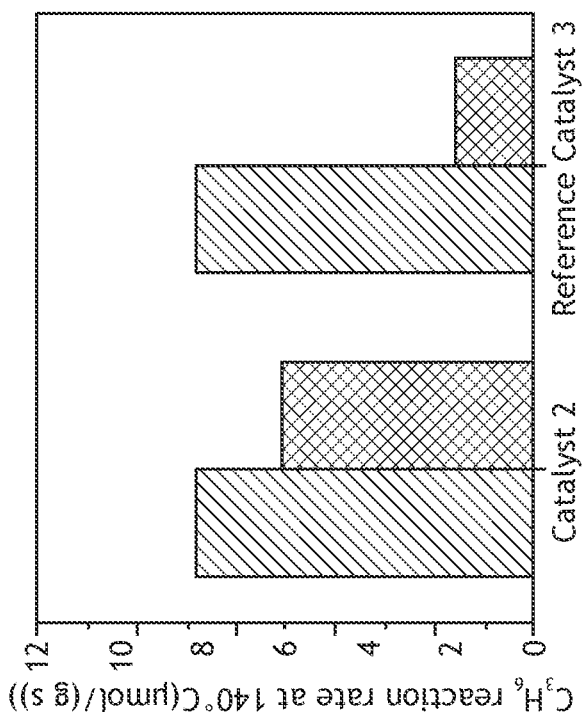
FIG. 8B is a bar chart of the steady-state propene ($C_3H_6$) oxidation performance ($C_3H_6$ reaction rate at 300° C.) for the catalyst 2 and reference catalyst 3 before and after aging in a standard air atmosphere at 800° C. for 12 hours, in accordance with one or more embodiments of the present disclosure.
Figure 8A:
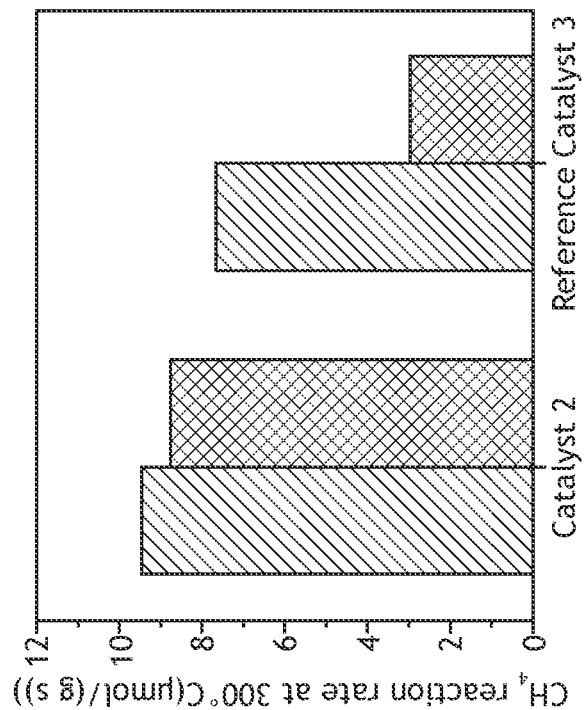
FIG. 8A is a bar chart of the steady-state methane ($CH_4$) oxidation performance ($CH_4$ reaction rate at 300° C.) for the catalyst 2 and reference catalyst 3 before and after aging in a standard air atmosphere at 800° C. for 12 hours, in accordance with one or more embodiments of the present disclosure.

Referring now to FIGS. 8A-8B, the performance of palladium catalysts with $CeO_2/Al_2O_3$ support structures formed under different conditions is described. In particular, FIGS. 8A-8B illustrate the performance of 1 wt. % Pd/30 wt. % $CeO_2/Al_2O_3$ catalyst structures.

Catalyst 2 may correspond to the catalyst 302 including the multi-step IWI support structure 304 fabricated in accordance with method 100. For example, catalyst 2 is formed using a two-step IWI technique in accordance with method 100. In particular, catalyst 1 was formed using the following steps:
1. IWI (e.g., step 104) of $Ce(NO_3)_3$ onto $\gamma$-$Al_2O_3$, followed by calcination (e.g., step 106) at 800° C. for 2 h to form 10 wt. % $CeO_2/Al_2O_3$ (multi-step IWI support structure 304)
2. IWI (e.g., step 108) of $Ce(NO_3)_3$ onto the 10 wt. % $CeO_2/Al_2O_3$ followed by calcination (e.g., step 110) at 550° C. for 2 h to form 30 wt. % $CeO_2/Al_2O_3$ (multi-step IWI support structure 304).
3. IWI (e.g., step 112) of Pd precursor onto 30 wt. % $CeO_2/Al_2O_3$ support, followed by calcination (e.g., step 114) at 550° C. for 2 h to form 1 wt. % Pd/30 wt. % $CeO_2/Al_2O_3$ (catalyst 302).

Reference catalyst 3 was formed using a single-step IWI process:
1. IWI of $Ce(NO_3)_3$ onto $\gamma$-$Al_2O_3$ followed by calcination at 550° C. for 2 h to form 30 wt. % $CeO_2/Al_2O_3$.
2. IWI of Pd precursor onto 30 wt. % $CeO_2/Al_2O_3$ support, followed by calcination at 550° C. for 2 h to form 1 wt. % Pd/30 wt. % $CeO_2/Al_2O_3$.

FIG. 8A is a bar chart of the steady-state methane ($CH_4$) oxidation performance ($CH_4$ reaction rate at 300° C.) for the catalysts before and after aging in a standard air atmosphere at 800° C. for 12 hours, in accordance with one or more embodiments of the present disclosure. In particular, the catalysts were exposed to a flow of 0.5 vol. % methane+2 vol. % $O_2$ (Ar balance) with a weight hourly space velocity of WHSV=200,000 mL/(g h) during the test. Further, each catalyst was pre-treated in 10% $H_2$/Ar flow at 400° C. for 1 h prior to the test.

FIG. 8B is a bar chart of the steady-state propene ($C_3H_6$) oxidation performance ($C_3H_6$ reaction rate at 300° C.) for the catalysts before and after aging in a standard air atmosphere at 800° C. for 12 hours, in accordance with one or more embodiments of the present disclosure. In particular, the catalysts were exposed to a flow of 0.2 vol. % $C_3H_6$+2 vol. % $O_2$ (Ar balance) with a weight hourly space velocity of WHSV=100,000 mL/(g h) during the test. Further, each catalyst was pre-treated in 10% $H_2$/Ar flow at 400° C. for 1 h prior to the test.

As illustrated in FIGS. 8A-8B, the fresh catalysts obtained by different methods having the same composition exhibited similar reaction rates for methane ($CH_4$) and propene ($C_3H_6$) oxidation, while significant difference was observed for the catalysts when aged at 800° C. For example, the catalyst 2 (e.g., the catalyst 302 fabricated according to the multi-step IWI technique disclosed herein) exhibited only a slight decrease of reaction rates for both $CH_4$ and $C_3H_6$ oxidation, while the reference catalyst exhibited a reaction rate decline of approximately 60% and 70% for methane and propene, respectively, when aged under these conditions. Accordingly, the $CeO_2/Al_2O_3$ support generated by multi-step IWI technique disclosed herein exhibits excellent thermal stability relative to traditional fabrication techniques.

Figures 9A, 9B:
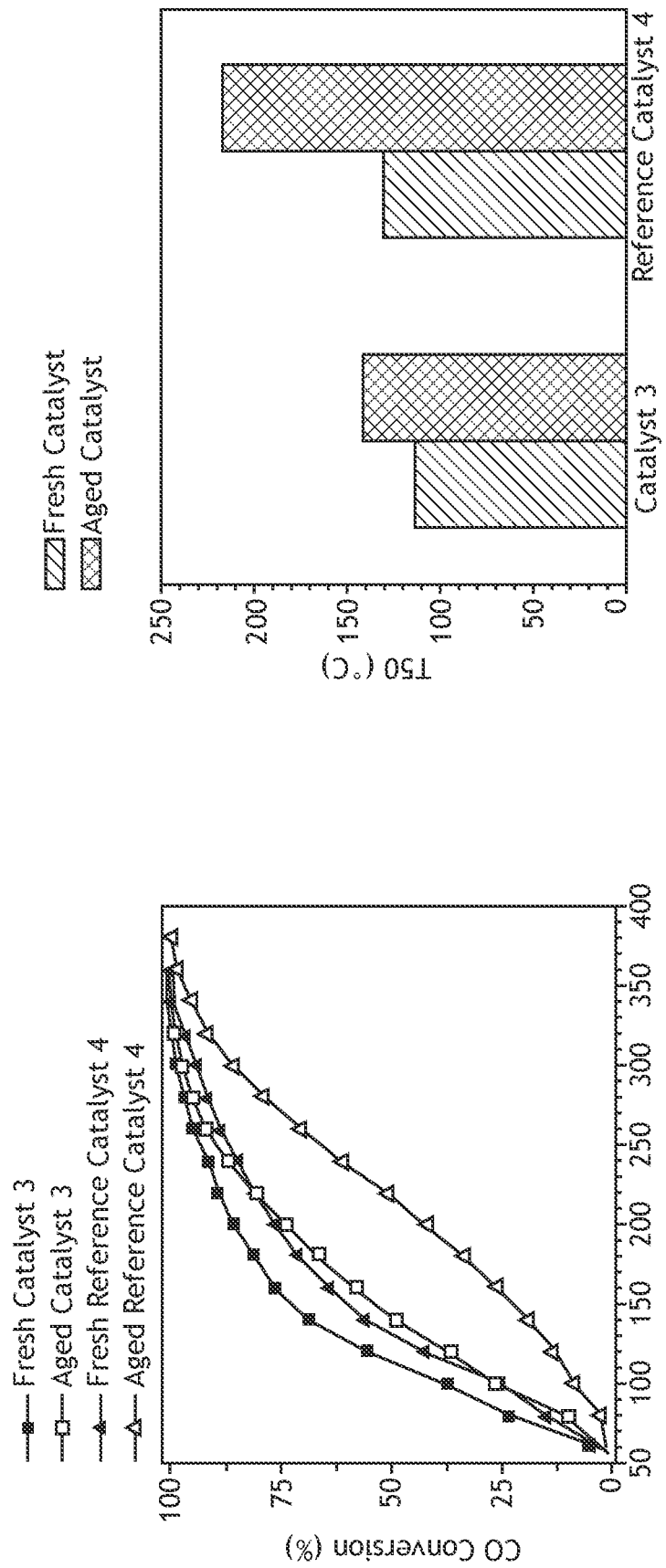
FIG. 9A is a plot illustrating the catalytic CO oxidation performance of catalyst 3 and reference catalyst 4 before and after aging in a standard air atmosphere at 800° C. for 12 hours, in accordance with one or more embodiments of the present disclosure.
FIG. 9B is a bar chart of the T50 for CO oxidation of catalyst 3 and reference catalyst 4 before and after aging in a standard air atmosphere at 800° C. for 12 hours, in accordance with one or more embodiments of the present disclosure.

Referring now to FIGS. 9A-9B, the performance of base metal oxide catalysts with $CeO_2/Al_2O_3$ support structures formed under different conditions is described. In particular, FIGS. 9A-9B illustrate the performance of 3 wt. % CuO/30 wt. % $CeO_2/Al_2O_3$ catalyst 302.

Catalyst 3 may correspond to the catalyst 302 including the multi-step IWI support structure 304 fabricated in accordance with method 100. For example, catalyst 3 is formed using a two-step IWI technique in accordance with method 100. In particular, catalyst 3 was formed using the following steps:
1. IWI (e.g., step 104) of $Ce(NO_3)_3$ onto $\gamma$-$Al_2O_3$ followed by calcination (e.g., step 106) at 800° C. for 2 h to form 10 wt. % $CeO_2/Al_2O_3$ (multi-step IWI support structure 304).
2. IWI (e.g., step 108) of $Ce(NO_3)_3$ onto 10 wt. % $CeO_2/Al_2O_3$ followed by calcination (e.g., step 110) at 550° C. for 2 h to form 30 wt. % $CeO_2/Al_2O_3$ (multi-step IWI support structure 304).
3. IWI (e.g., step 112) of Cu precursor onto 30 wt. % $CeO_2/Al_2O_3$-T support, followed by calcination (e.g., step 114) at 550° C. for 2 h to form 3 wt. % CuO/30 wt. % $CeO_2/Al_2O_3$ (catalyst 302).

Reference catalyst 4 is formed using a one-step IWI technique using the following steps:
1. IWI of $Ce(NO_3)_3$ onto $\gamma$-$Al_2O_3$ followed by calcination at 550° C. for 2 h to form 30 wt. % $CeO_2/Al_2O_3$.

2. IWI of Cu precursor onto 30 wt. % $CeO_2/Al_2O_3$ support followed by calcination at 550° C. for 2 h to form 3 wt. % CuO/30 wt. % $CeO_2/Al_2O_3$.

FIG. 9A is a plot illustrating the catalytic CO oxidation performance of catalyst 3 and reference catalyst 4 before and after aging in a standard air atmosphere at 800° C. for 12 hours, in accordance with one or more embodiments of the present disclosure. The reactant composition for the test was 1 vol. % CO+1 vol. % $O_2$ (Ar balance) with a weight hourly space velocity of WHSV=200,000 mL/(g h).

FIG. 9B is a bar chart of the T50 for CO oxidation of catalyst 3 and reference catalyst 4 before and after aging in a standard air atmosphere at 800° C. for 12 hours, in accordance with one or more embodiments of the present disclosure. T50 refers to the temperature at which CO conversion achieved 50%.

As shown in FIGS. 9A and 9B, the fresh catalyst obtained by the multi-step IWI method (catalyst 3) exhibited higher CO oxidation activities than the reference catalyst 4. Compared to the fresh catalysts, only a slight decrease of T50 (ca. 29° C.) was observed for the invention catalyst 3 for CO oxidation, while an approximate. 87° C. decline was detected for reference catalyst 4. Obviously, the $CeO_2/Al_2O_3$ support generated by the multi-step IWI method 100 showed excellent thermal stability over the one prepared by traditional one-step IWI method. In other words, this facile multi-step IWI method 100 for preparation of catalyst supports (e.g., here illustrated as a $CeO_2$-based multi-step IWI support structure 304) may significantly facilitate highly active and stable transition metal catalysts for various catalytic reactions.

Referring now to FIGS. 10-21, systems and methods for engineering surface defects on metal oxides (e.g., catalyst supports including metal oxides) to improve catalytic performance are described in greater detail. It is contemplated herein that precious metal catalysts on metal oxide catalyst supports (e.g., $Pt/CeO_2$ catalysts) have been generally shown to exhibit excellent catalytic performance. However, the practical utility of these catalysts when fabricated using traditional techniques is limited or requires expensive raw materials that drive up the overall cost.

For example, surface defects may facilitate highly-stable anchoring sites for catalyst materials such as, but not limited to, precious metals or base metals. As a result, catalyst materials anchored to these sites may generally be thermally stable, even upon aging. However, metal oxides may have a limited number or density of naturally-occurring surface defects to serve as stable anchoring points. As a result, precious metals loaded onto the metal oxide surface may largely attach to the metal oxide surface through relatively weak bonds, which may result in the formation of randomly-dispersed clusters of the catalyst materials through diffusion, sintering, coalescing, or the like and a general decrease in performance. Additionally, the clustering of the catalyst materials may require relatively high loading concentrations of the relatively expensive catalyst materials to achieve a desired level of catalytic activity.

It is further contemplated herein that traditional techniques for introducing surface defects such as hydrothermal synthesis or exposure of specific crystal planes of the metal oxide during fabrication may be complex or costly. Further, these techniques are often demonstrated on $CeO_2$, but may have limited extension to other metal oxides. Further, the density of surface defects that can be generated with these techniques may generally be limited by intrinsic properties of the metal oxide.

Figure 10:
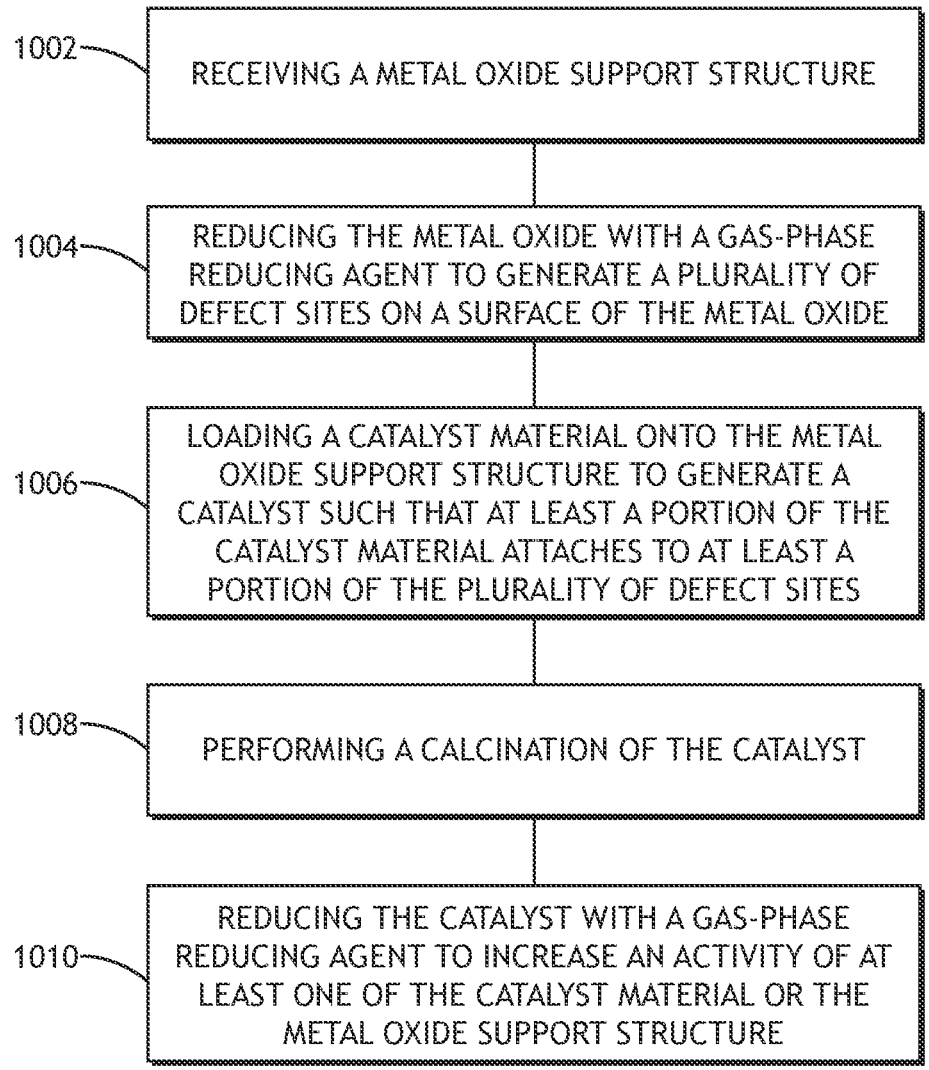
FIG. 10 is a flow diagram for a method for engineering surface defects on a metal oxide support through gas-phase reduction, in accordance with one or more embodiments of the present disclosure.

FIG. 10 is a flow diagram for a method 1000 for engineering surface defects on a metal oxide support through gas-phase reduction, in accordance with one or more embodiments of the present disclosure. The method may be applied to catalyst support structures formed from either bulk metal oxide catalyst supports or hybrid metal oxide catalyst supports such as, but not limited to, those described with respect to method 100 above. Further, it is contemplated herein that the method 1000 may be suitable for any desired loading concentration of the catalyst materials. For example, relatively low-concentration loading may facilitate atomically-dispersed catalyst materials and/or single-layer catalyst structures for high atomic utilization efficiency. By way of another example, relatively-high-concentration loading may facilitate larger catalyst material structures anchored by the defect sites to provide high catalytic activity while maintaining stability under aging.

Figure 11:
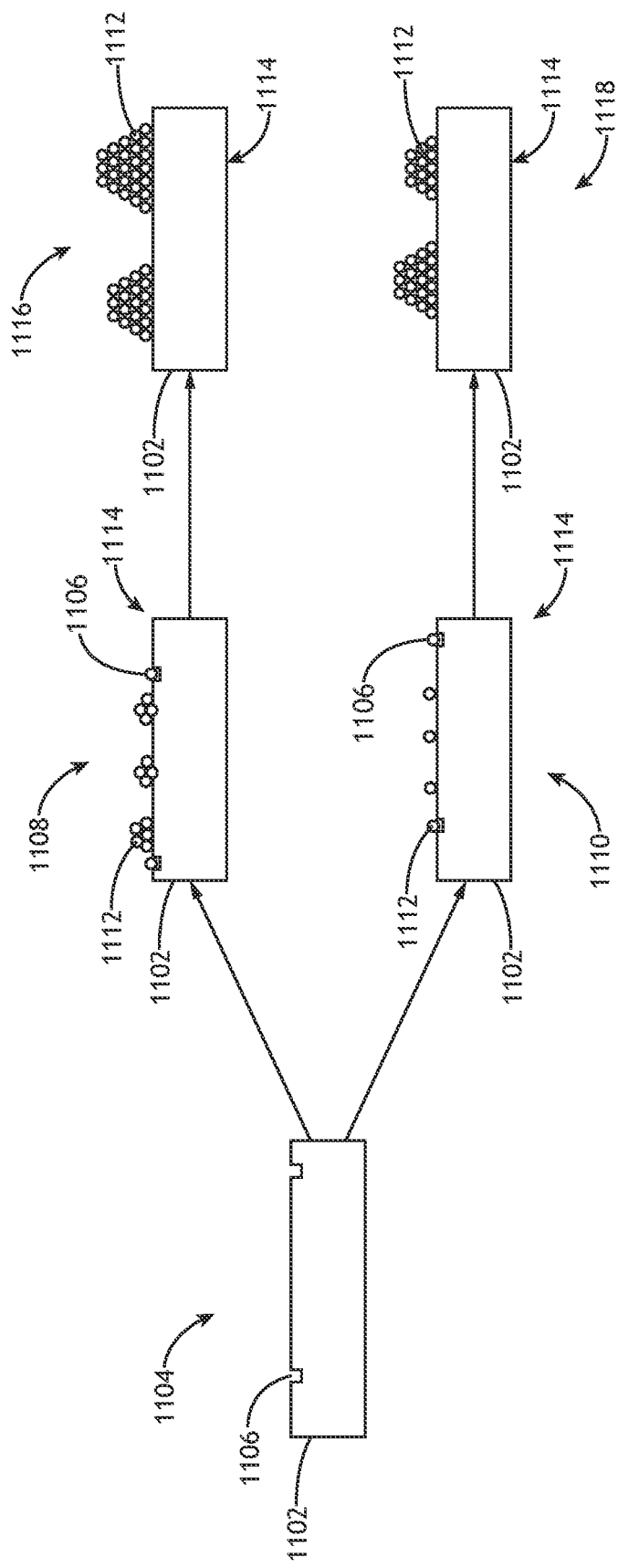
FIG. 11 is a diagrammatic view illustrating both high-concentration and low-concentration loading of metals on unprocessed reducible metal oxide, in accordance with one or more embodiments of the present disclosure.
Figure 12:
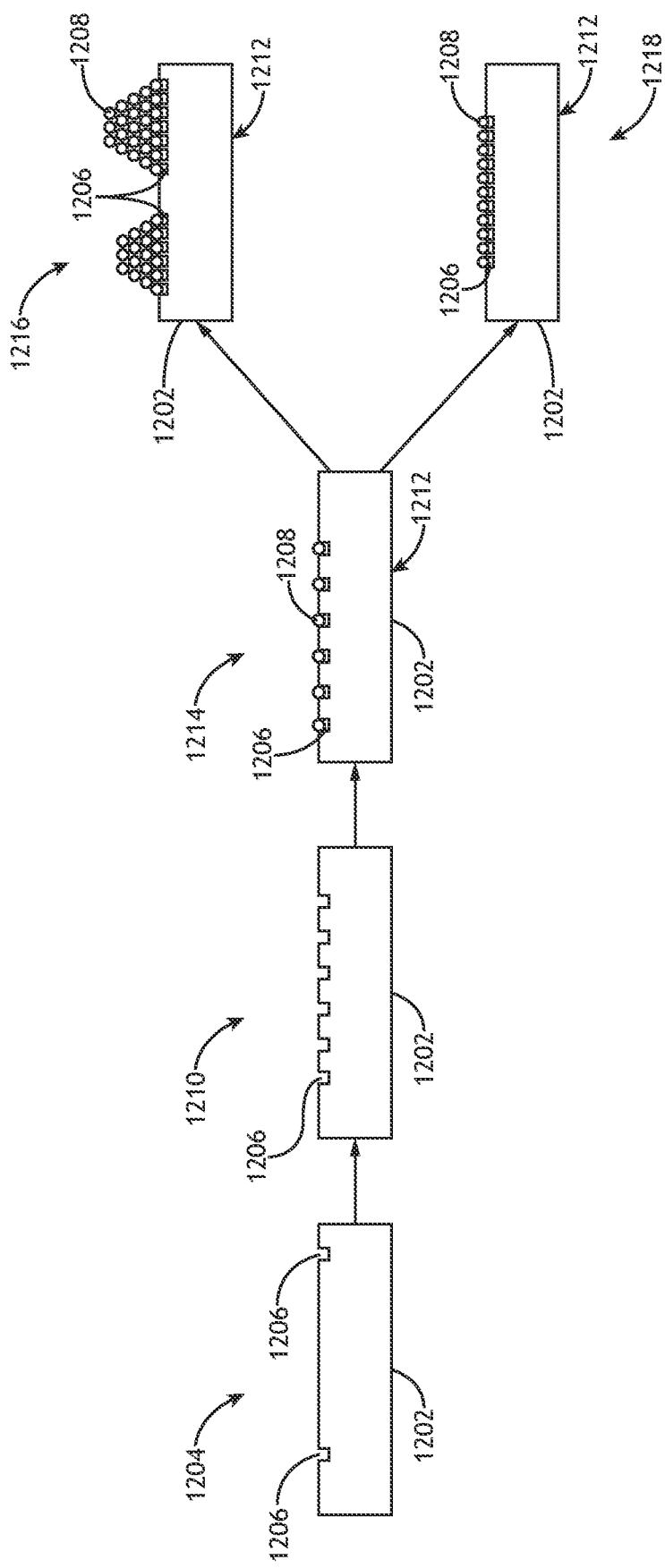
FIG. 12 is a diagrammatic view illustrating high-concentration and low-concentration loading of metals on metal oxide supports having engineered surface defects in accordance with one or more embodiments of the present disclosure.

FIG. 11 is a diagrammatic view illustrating both high-concentration and low-concentration loading of metals on unprocessed metal oxide, in accordance with one or more embodiments of the present disclosure. FIG. 12 is a diagrammatic view illustrating high-concentration and low-concentration loading of metals on metal oxide supports having engineered surface defects generated according to method 1000 in accordance with one or more embodiments of the present disclosure. In this regard, FIGS. 11 and 12 may illustrate the method 1000 and at least some of the associated benefits.

Referring now to FIG. 11, catalyst fabrication on unprocessed metal oxide 1102 (e.g., a reducible metal oxide) is described in greater detail. The frame 1104 of FIG. 11 depicts unprocessed metal oxide 1102 with sparsely-distributed naturally-occurring surface defects 1106. The frame 1108 and frame 1110 illustrate loading of a catalyst material 1112 (here, illustrated as precious metals) with relatively-high and relatively-low concentrations, respectively, for form catalysts 1114. It is to be understood that the descriptions of relatively-high and relatively-low concentrations are provided solely for illustrative purposes and should not be interpreted as limiting, but rather are to be understood as depicting the relative impact of varying the loading concentration.

As illustrated in both frame 1108 and frame 1110, the metal oxide 1102 may naturally have some surface defects 1106, though the surface defects 1106 will typically have a low density. Loading the catalyst material 1112 onto the surface of the metal oxide 1102 may thus result in some portion of the catalyst material 1112 being anchored to the surface defects 1106. However, much of the catalyst material 1112 will simply be adsorbed onto the surface of the metal oxide 1102, either as distributed single atoms in the case of relatively low loading concentrations or as clusters in the case of relatively high loading concentrations.

It is contemplated herein that the catalyst material 1112 adsorbed onto the surface of the metal oxide 1102 at locations other than the surface defects 1106 will typically not be thermally stable and will tend to form larger clusters over time or upon further heating (e.g., via a calcination step, a second reduction step, an aging step, or the like). For example, frame 1116 and frame 1118 illustrate resulting catalysts 1114 based on high-concentration and low-concentration loading conditions, respectively, after an activation process. For instance, the activation step may include, but is not limited to, exposure to a reactant gas such as, $H_2$, CO, or the like.

In one embodiment, the method 1000 includes a step 1002 of receiving a metal oxide 1202 (e.g., an unprocessed metal oxide 1202) as a catalyst support. For example, frame 1204 of FIG. 12 illustrates an unprocessed metal oxide 1202 as a catalyst support, which may be the same type of metal oxide 1202 illustrated in frame 1104 of FIG. 11. The metal oxide support material may be any type of metal oxide support suitable for catalysis. In some embodiments, the metal oxide support material includes, but not limited to single metal oxides such as ceria, iron oxide, manganese oxide, nickel oxide, copper oxide, cobalt oxide, as well as their mixed metal oxides including ceria-zirconia, copper-cerium oxide, or iron-cobalt oxide. Further, the metal oxide support material may include a bulk metal oxide or a hybrid metal oxide support material such as, but not limited to, those described with respect to method 100 above (e.g., a multi-step IWI support structure 304). As illustrated in frame 1204, the metal oxide 1102 may have sparsely-distributed naturally-occurring surface defects 1206.

In another embodiment, the method 1000 includes a step 1004 of reducing the metal oxide 1102 support material with a gas-phase reducing agent to generate a plurality of additional engineered surface defects 1206 on the metal oxide 1202.

As described previously herein, surface defects 1206 may be used to stably anchor catalyst materials 1208 such as, but not limited to, precious metals or base metals to the metal oxide 1202. Further, a high density of surface defects 1206 (e.g., a combination of naturally-occurring and engineered surface defects 1206) may facilitate a uniform distribution of the catalyst materials 1208 across the surface of a metal oxide 1202.

The frame 1210 in FIG. 12 illustrates the generation of additional engineered surface defects 1206 across the surface of the metal oxide 1202 support in step 1004 through a gas-phase reduction process. In some embodiments, step 1004 includes heating the metal oxide 1202 in an atmosphere including a reactant gas to promote reduction reactions that generate surface defects 1206. It is contemplated herein that the types of surface defects 1206 generated during gas-phase reduction may vary based on the specific metal oxide used, the reactant gas, the temperature, and the duration of exposure. For example, surface defects 1206 generated using gas-phase reduction may include, but are not limited to, oxygen vacancies, metal vacancies, or the like. Accordingly, these factors may be selected or otherwise controlled to provide selected types or distributions of surface defects 1206.

The reactant gas may include any gas suitable for reducing metal oxides to generate surface defects such as, but not limited to, $H_2$, CO, $CH_4$, $C_3H_6$, or $C_3H_8$. The reactant gas may include pure reductive gas or a gas mixture including a reductive reactant and an inert gas. In some embodiments, the reactant forms approximately 10% of the gas mixture. The available concentration of reactant could be varied from 100 ppm to 100%. Further, the reactant gas may include water or be free of water. The gas-phase reduction process of step 1004 may additionally be carried out at any suitable temperature or duration. For example, the gas-phase reduction process of step 1004 may be carried out in a temperature ranging from 250° C. to 900° C. It is recognized herein that the reduction temperature may depend on the reducibility of a particular metal oxide 1202 used. As an example, for metal oxides such as CuO and $Fe_2O_3$, the temperature may be as low as 250° C. In addition, the reduction time typically depends on the concentration of reactant and reduction temperature.

In another embodiment, the method 1000 includes a step 1006 of loading a catalyst material 1208 onto the metal oxide 1202 to generate a loaded metal or metal oxide catalyst 1212, wherein at least a portion of the catalyst materials 1208 attaches to the plurality of surface defects 1206 (e.g., including naturally-occurring and engineered surface defects 1206). The catalyst materials 1208 may include any metal or metal oxide suitable for catalysis such as, but not limited to, platinum, palladium, rhodium, iridium, or gold, as well as transition metals or relative metal oxides such as Cu, Ni, Fe, or Co.

The frame 1214 of FIG. 12 depicts the loading of catalyst materials 1208 onto the metal oxide 1202 support. For example, frame 1214 particularly illustrates the stable anchoring of single atoms of catalyst materials 1208 to the surface defects 1206 across the surface of the metal oxide 1202. Further, it is to be understood that the frame 1214 is not intended to depict relatively high or low loading concentrations, but rather the ability to anchor catalyst materials 1208 across a high-density of surface defects 1206 generated by the reduction in step 1004.

In another embodiment, the method 1000 includes a step 1008 of performing a calcination of the loaded metal oxide support to stabilize the catalyst structure. For example, the calcination in step 1008 may be substantially similar to the calcination in step 110 of the method 100 above.

In another embodiment, the method 1000 includes a step 1010 of reducing the catalyst 1212. For example, the reduction step 1010 may further activate the metal oxide 1202 and/or the catalyst materials 1208 and may thus be characterized as an activation step. Additionally, the reduction step 1010 may be performed after the loading of catalyst materials 1208 in step 1006 and/or the calcination in step 1008.

The frame 1216 and frame 1218 of FIG. 12 depict a catalyst 1212 after calcination in step 1008 and/or reduction in step 1010 based on relatively high-concentration and relatively low-concentration loading of the catalyst materials 1208 in step 1006. For example, the frame 1218 illustrates the formation of lattice-confined layers of catalyst materials 1208 (e.g., single layers) of catalyst materials 1208 that are stably anchored for long lifetime performance and high atomic utilization. By way of another example, the frame 1216 illustrates the formation of lattice-confined clusters of the catalyst materials 1208. In a general sense, it is contemplated herein that the morphology of metal on support with engineered defects may be controlled at an atomic level by tuning the loading concentration of the catalyst materials 1208 in step 1006, the calcination conditions in step 1008, and the reduction activation conditions in step 1010. For example, the concentration of the catalyst material may be tuned within a range of 0.025 to 30 weight percent to control the size of clusters of the catalyst materials 1208 on the metal oxide 206 as well as the overall amount of the precious metals 210. For example, by varying the calcination temperature in step 1008 between 350 and 800° C., the clusters and single-atom sites of the catalyst materials 1208 on the metal oxide 206 can be controlled. Tuning the reduction activation temperature (e.g., 100-500° C.) and duration time (e.g., 15 min to 4 hs) may be able to control the size of clusters. In this regard, structures such as, but not limited to, single-atom sites, single-layer structures, or larger clusters of the precious metals 210 may be controllably generated. Accordingly, the method 1000 may provide new insights and methods for material design and preparation at a molecular or atomic level.

Referring now to FIGS. 13-21, the formation of engineered surface defects 1206 on reducible metal oxide 1202 support structures and the catalytic performance of a fully-formed catalyst 1212 are described in greater detail in accordance with one or more embodiments of the present disclosure. In particular, FIGS. 13-21 relate to the following structures, where the suffix "-eng" denotes structures with surface-engineered defects (e.g., generated in accordance with the method 1000). In general, catalysts were formed with and without engineered surface defects 1206 generated in accordance with the method 1000 to provide an analysis of the impact of the engineered surface defects 1206 on the performance of the catalysts.

In one embodiment, a catalyst 4 (1.0Pt/30CeO$_2$/Al$_2$O$_3$-eng.) including engineered surface defects 1206 was formed using the following steps:
  a. IWI of Ce(NO$_3$)$_3$ onto γ-Al$_2$O$_3$ followed by calcination at 550° C. for 2 h (30 wt. % CeO$_2$/Al$_2$O$_3$, denoted as 30CeO$_2$/Al$_2$O$_3$).
  b. Reduction of 30 wt. % CeO$_2$/Al$_2$O$_3$ in 10% H$_2$/Ar or 10% CO/Ar flow at 750° C. for 2 h (30CeO$_2$/Al$_2$O$_3$-eng., denoted as support 1).
  c. IWI of Pt precursor onto support 1, followed by calcination at 550° C. for 2 h (1.0Pt/30CeO$_2$/Al$_2$O$_3$-eng., denoted as catalyst 4).

In another embodiment, reference catalyst 5 (1.0Pt/30CeO$_2$/Al$_2$O$_3$) without engineered surface defects 1206 was formed using the following steps:
  a. IWI of Ce(NO$_3$)$_3$ onto γ-Al$_2$O$_3$ followed by calcination at 550° C. for 2 h (30 wt. % CeO$_2$/Al$_2$O$_3$, denoted as 30CeO$_2$/Al$_2$O$_3$).
  b. Calcination of 30 wt. % CeO$_2$/Al$_2$O$_3$ in air at 750° ° C. for 2 h (30CeO$_2$/Al$_2$O$_3$, denoted as reference support 1).
  c. IWI of Pt precursor onto Reference Support 1, followed by calcination at 550° C. for 2 h (1.0Pt/30CeO$_2$/Al$_2$O$_3$, denoted as reference catalyst 5).

In one embodiment, a catalyst 5 (0.25Pt/30CeO$_2$/Al$_2$O$_3$-eng) including engineered surface defects 1206 was formed using the following steps:
  a. IWI of Ce(NO$_3$)$_3$ onto γ-Al$_2$O$_3$ followed by calcination at 550° C. for 2 h (30 wt. % CeO$_2$/Al$_2$O$_3$, denoted as 30CeO$_2$/Al$_2$O$_3$).
  b. Reduction of 30 wt. % CeO$_2$/Al$_2$O$_3$ in 10% H$_2$/Ar or 10% CO/Ar flow at 750° C. for 2 h (30CeO$_2$/Al$_2$O$_3$-eng., denoted as support 1).
  c. IWI of Pt precursor onto Support 1, followed by calcination at 550° C. for 2 h (0.25Pt/30CeO$_2$/Al$_2$O$_3$-eng., denoted as catalyst 5).

In another embodiment, reference catalyst 6 (0.25Pt/30CeO$_2$/Al$_2$O$_3$) without engineered surface defects 1206 was formed using the following steps:
  a. IWI of Ce(NO$_3$)$_3$ onto γ-Al$_2$O$_3$ followed by calcination at 550° C. for 2 h (30 wt. % CeO$_2$/Al$_2$O$_3$, denoted as 30CeO$_2$/Al$_2$O$_3$).
  b. Calcination of 30 wt. % CeO$_2$/Al$_2$O$_3$ in air at 750° C. for 2 h (30CeO$_2$/Al$_2$O$_3$, denoted as reference support 1).
  c. IWI of Pt precursor onto Support 1, followed by calcination at 550° C. for 2 h (0.25Pt/30CeO$_2$/Al$_2$O$_3$, denoted as reference catalyst 6).

In one embodiment, a catalyst 6 (1.0Pt/CeO$_2$—C-eng.) including engineered surface defects 1206 was formed using the following steps:
  a. Calcination of commercial CeO$_2$ at 550° C. for 2 h (denoted as CeO$_2$—C).
  b. Reduction of CeO$_2$ in 10% H$_2$/Ar flow at 750° ° C. for 2 h (CeO$_2$—C-eng., denoted as support 2).
  c. IWI of Pt precursor onto support 2, followed by calcination at 550° C. for 2 h (1.0Pt/CeO$_2$—C-eng., denoted as catalyst 6).

In another embodiment, reference catalyst 7 (1.0Pt/CeO$_2$—C) without engineered surface defects 1206 was formed using the following steps:
  a. Calcination of commercial CeO$_2$ at 550° ° C. for 2 h (denoted as CeO$_2$—C).
  b. Calcination of CeO$_2$ in air at 750° C. for 2 h (CeO$_2$—C, denoted as reference support 2).
  c. IWI of Pt precursor onto reference support 2, followed by calcination at 550° C. for 2 h (1.0Pt/CeO$_2$—C, denoted as reference catalyst 7).

In one embodiment, a catalyst 7 (1.0Pt/CeZrO$_x$—C-eng.) including engineered surface defects 1206 was formed using the following steps:
  a. Calcination of commercial CeZrO$_x$ at 550° C. for 2 h (denoted as CeZrO$_x$—C).
  b. Reduction of CeZrO$_x$—C in 10% H$_2$/Ar flow at 750° C. for 2 h (CeZrO$_x$—C-eng., denoted as support 3).
  c. IWI of Pt precursor onto support 3, followed by calcination at 550° C. for 2 h (CeZrO$_x$—C-eng., denoted as catalyst 7).

In another embodiment, reference catalyst 8 (1.0Pt/CeZrO$_x$—C) without engineered surface defects 1206 was formed using the following steps:
  a. Calcination of commercial CeZrO$_x$ at 550° C. for 2 h (denoted as CeZrO$_x$—C).
  b. Calcination of CeZrO$_x$—C in air at 750° C. for 2 h (CeZrO$_x$—C, denoted as reference support 3).
  c. IWI of Pt precursor onto reference support 3, followed by calcination at 550° C. for 2 h (1.0Pt/CeZrO$_x$—C, denoted as reference catalyst 8).

In one embodiment, a catalyst 8 (0.5Pt/20Fe$_2$O$_3$/Al$_2$O$_3$-eng.) including engineered surface defects 1206 was formed using the following steps:
  a. IWI of Fe(NO$_3$)$_2$ onto γ-Al$_2$O$_3$ followed by calcination at 550° C. for 2 h (20 wt. % Fe$_2$O$_3$/Al$_2$O$_3$, denoted as 20Fe$_2$O$_3$/Al$_2$O$_3$).
  b. Reduction of 20Fe$_2$O$_3$/Al$_2$O$_3$ in 10% H$_2$/Ar flow at 300° C. for 2 h (20Fe$_2$O$_3$/Al$_2$O$_3$-eng., denoted as support 4).
  c. IWI of Pt precursor onto support 4, followed by calcination at 550° C. for 2 h (0.5Pt/20Fe$_2$O$_3$/Al$_2$O$_3$-eng., catalyst 8).

In another embodiment, reference catalyst 9 (0.5Pt/20Fe$_2$O$_3$/Al$_2$O$_3$) without engineered surface defects 1206 was formed using the following steps:
  a. IWI of Fe(NO$_3$)$_2$ onto γ-Al$_2$O$_3$ followed by calcination at 550° C. for 2 h (20 wt. % Fe$_2$O$_3$/Al$_2$O$_3$, denoted as 20Fe$_2$O$_3$/Al$_2$O$_3$).
  b. Calcination of 20Fe$_2$O$_3$/Al$_2$O$_3$ in air at 300° C. for 2 h (20Fe$_2$O$_3$/Al$_2$O$_3$, denoted as reference support 4).
  c. IWI of Pt precursor onto reference support 4, followed by calcination at 550° C. for 2 h (1.0Pt/20Fe$_2$O$_3$/Al$_2$O$_3$, denoted as reference catalyst 9).

In one embodiment, a catalyst 9 (0.5Pt/25CuO/Al$_2$O$_3$-eng.) including engineered surface defects 1206 was formed using the following steps:
  a. IWI of Cu(NO$_3$)$_2$ onto γ-Al$_2$O$_3$ followed by calcination at 550° ° C. for 2 h (25 wt. % CuO/Al$_2$O$_3$, denoted as 25CuO/Al$_2$O$_3$).
  b. Reduction of 25CuO/Al$_2$O$_3$ in 10% H$_2$/Ar flow at 250° C. for 2 h (25CuO/Al$_2$O$_3$-eng., denoted as support 5).
  c. IWI of Pt precursor onto support 5, followed by calcination at 550° C. for 2 h (0.5Pt/25CuO/Al$_2$O$_3$-eng., denoted as catalyst 9).

In another embodiment, reference catalyst 10 (0.5Pt/25CuO/Al$_2$O$_3$) without engineered surface defects 1206 was formed using the following steps:

a. IWI of $Cu(NO_3)_2$ onto $\gamma$-$Al_2O_3$ followed by calcination at 550° C. for 2 h (25 wt. % $CuO/Al_2O_3$, denoted as 25$CuO/Al_2O_3$).

d. Calcination of 25$CuO/Al_2O_3$ in air at 250° C. for 2 h (25$CuO/Al_2O_3$, denoted as reference support 5).

e. IWI of Pt precursor onto reference support 5, followed by calcination at 550° C. for 2 h (1.0Pt/25$CuO/Al_2O_3$, denoted as reference catalyst 10).

Figure 13:
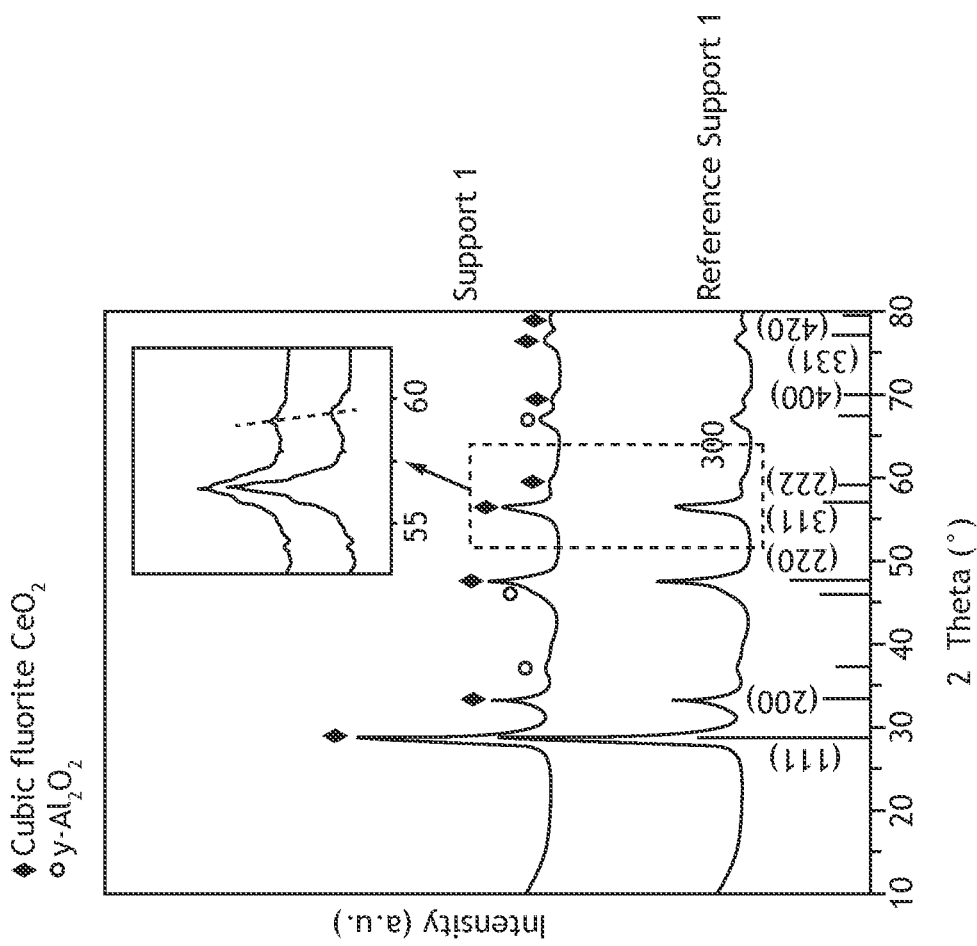
FIG. 13 is a plot of X-ray diffraction of support 1 and reference support 1, in accordance with one or more embodiments of the present disclosure.

FIG. 13 is a plot of X-ray diffraction of support 1 and reference support 1, in accordance with one or more embodiments of the present disclosure. The peaks of support 1 are shifted slightly to a lower degree, indicating an expansion of the crystal structure of $CeO_2$ upon $H_2$ treatment and evidence that support 1 has more defects than reference support 1. Additionally, both support 1 and reference support 1 could be well indexed to a mixture phase of cubic fluorite $CeO_2$ and $\gamma$-$Al_2O_3$.

Figure 14:
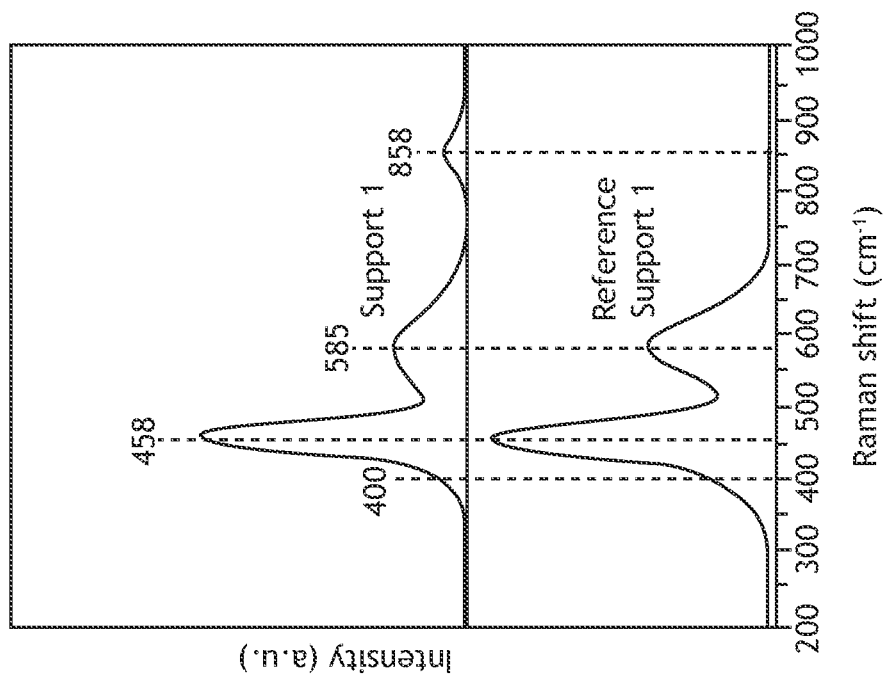
FIG. 14 is a plot of Raman spectra of support 1 and reference support 1, in accordance with one or more embodiments of the present disclosure.

FIG. 14 is a plot of Raman spectra of support 1 and reference support 1, in accordance with one or more embodiments of the present disclosure. In order to determine the surface defects concentration, $O_{vac}/(O_{latt}+O_{vac})$ ratios of support 1 and reference support 1 were calculated to be 48% and 41%, determined by Raman spectra. It is thus clear that support 1 has more defects (e.g., oxygen vacancies) than reference support 1, which is in good agreement with XRD results in FIG. 13. Further, the XRD and Raman results illustrate that the reduction process efficiently provide engineered surface defects on $CeO_2$.

Figure 15:
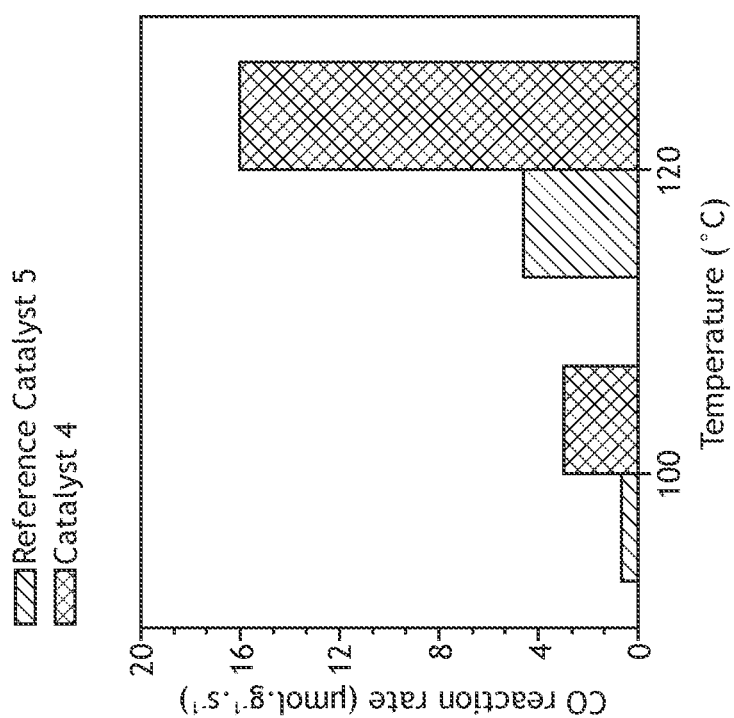
FIG. 15 is a bar chart of CO oxidation activity (at 60 and 100° C.) for catalyst 4 and reference catalyst 5, in accordance with one or more embodiments of the present disclosure.

FIG. 15 is a bar chart of CO oxidation activity (at 60 and 100° C.) for catalyst 4 and reference catalyst 5, in accordance with one or more embodiments of the present disclosure. In particular, the bar chart in FIG. 15 is generated based on steady state flow with [CO]=[$O_2$]=1% balanced with Ar at WHSV of 200,000 ml·$g_{cat}^{-1}$·$h^{-1}$. The CO reaction rates on catalyst 4 at different temperatures were more than 3 times higher than that on reference catalyst 5, which suggested that surface defect engineering on $CeO_2$ could largely improve CO oxidation activity of Pt/$CeO_2$/$Al_2O_3$ catalyst.

Figure 16:
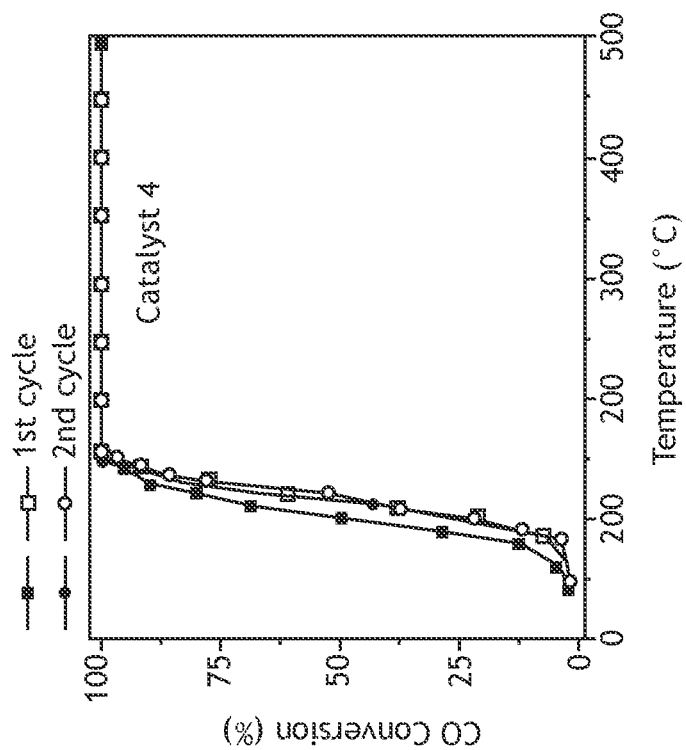
FIG. 16 is a plot of heating/cooling conversion curves of CO oxidation as a function of temperature up to 500° C. for catalyst 4 in accordance with one or more embodiments of the present disclosure.

FIG. 16 is a plot of heating/cooling conversion curves of CO oxidation as a function of temperature up to 500° C. for catalyst 4 in accordance with one or more embodiments of the present disclosure. The plot is generated based on steady state flow with [CO]=[$O_2$]=1% balanced with Ar at WHSV of 200,000 ml $g_{cat}^{-1}$·$h^{-1}$ for 30 minutes at each point. Catalyst 4 exhibited good catalytic stability during the cycling test. Accordingly, catalysts prepared with engineered surface defects in accordance with the present disclosure exhibit good thermal stability under present testing conditions.

Figure 17:
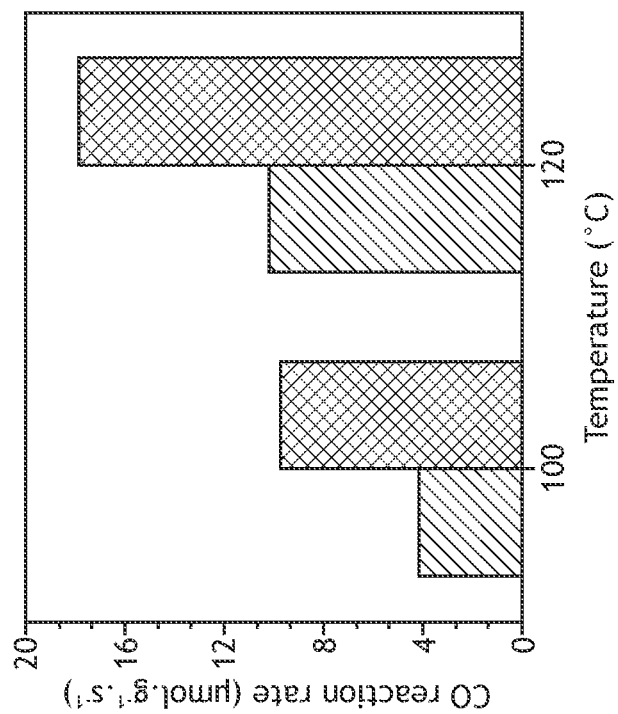
FIG. 17 is a bar chart of CO oxidation activity (at 100 and 120° C.) for catalyst 5 and reference catalyst 6, in accordance with one or more embodiments of the present disclosure.

FIG. 17 is a bar chart of CO oxidation activity (at 100 and 120° C.) for catalyst 5 and reference catalyst 6, in accordance with one or more embodiments of the present disclosure. In particular, the bar chart is generated based on steady state flow with [CO]=[$O_2$]=1% balanced with Ar at WHSV of 200,000 ml·$g_{cat}^{-1}$·$h^{-1}$. The CO reaction rates on catalyst 5 at different temperatures were about 2 times higher than that on reference catalyst 6, which indicates that surface defect engineering also worked well for low Pt loading case in Pt/$CeO_2$/$Al_2O_3$ catalyst.

Figure 18:
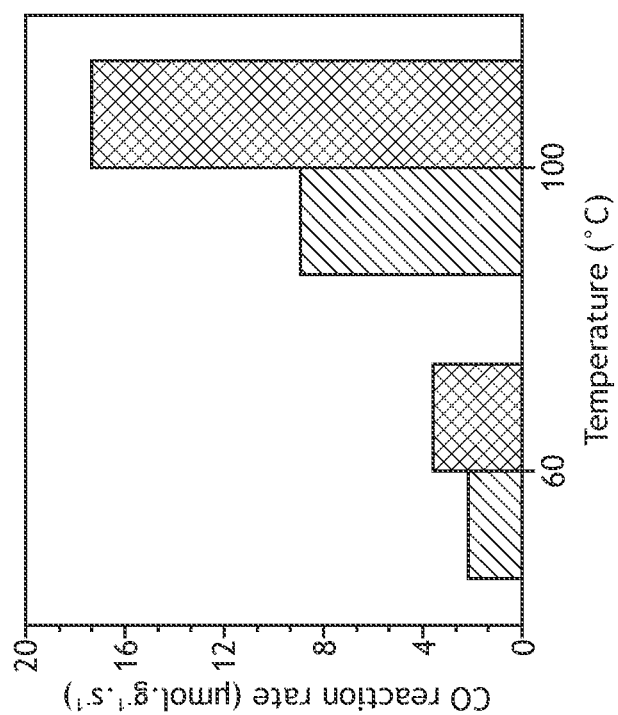
FIG. 18 is a bar chart of CO oxidation activity (at 60 and 100° C.) for catalyst 6 and reference catalyst 7, in accordance with one or more embodiments of the present disclosure.

FIG. 18 is a bar chart of CO oxidation activity (at 60 and 100° C.) for catalyst 6 and reference catalyst 7, in accordance with one or more embodiments of the present disclosure. In particular, the bar chart is generated based on steady state flow with [CO]=[$O_2$]=1% balanced with Ar at WHSV of 200,000 ml·$g_{cat}^{-1}$·$h^{-1}$. The CO reaction rates on catalyst 6 at different temperatures were about 2 times higher than that on reference catalyst 7, indicating that the defect engineering process also works well on pure $CeO_2$ supports.

Figures 19, 20:
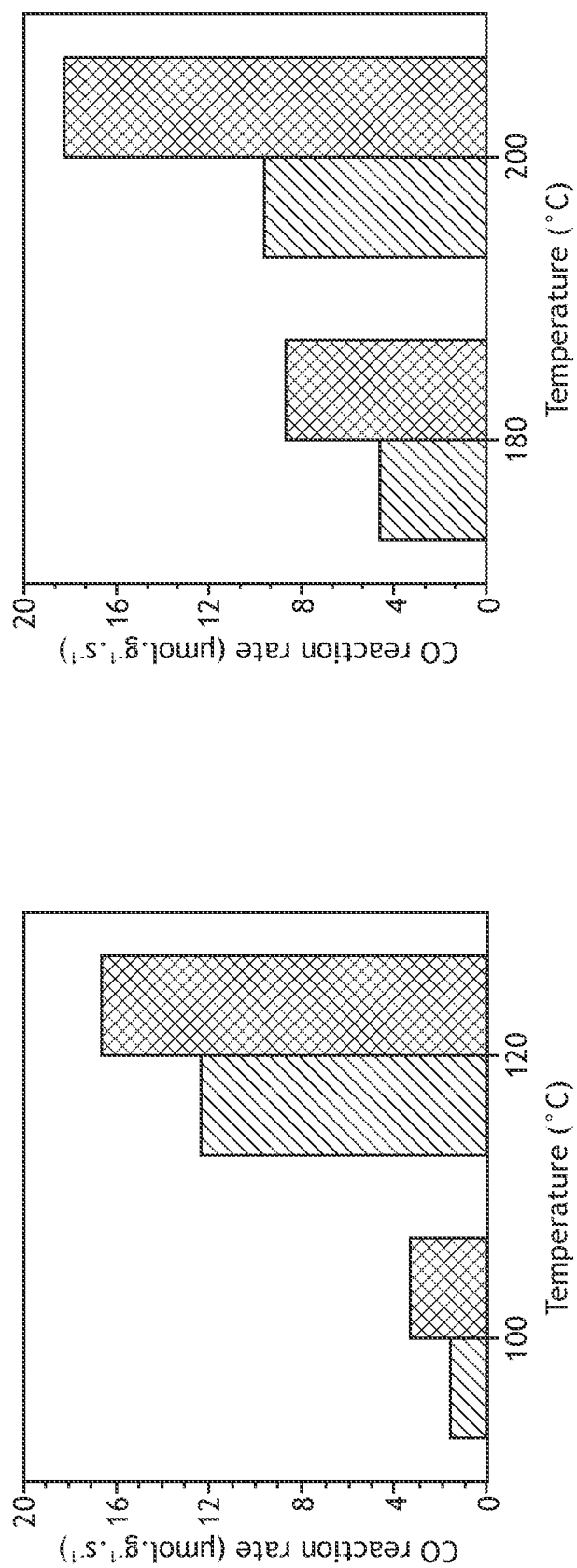
FIG. 19 is a bar chart of CO oxidation activity (at 100 and 120° C.) for catalyst 7 and reference catalyst 8, in accordance with one or more embodiments of the present disclosure.
FIG. 20 is a bar chart of CO oxidation activity (at 180 and 200° C.) for catalyst 8 and reference catalyst 9, in accordance with one or more embodiments of the present disclosure.

FIG. 19 is a bar chart of CO oxidation activity (at 100 and 120° C.) for catalyst 7 and reference catalyst 8, in accordance with one or more embodiments of the present disclosure. In particular, the bar chart is generated based on steady state flow with [CO]=[$O_2$]=1% balanced with Ar at WHSV of 200,000 ml·$g_{cat}^{-1}$·$h^{-1}$. The CO reaction rates on catalyst 7 at different temperatures were much higher than that on reference catalyst 8, indicating that the defect engineering process also works well on CeZr$O_x$ supports.

FIG. 20 is a bar chart of CO oxidation activity (at 180 and 200° C.) for catalyst 8 and reference catalyst 9, in accordance with one or more embodiments of the present disclosure. In particular, the bar chart is generated based on steady state flow with [CO]=[$O_2$]=1% balanced with Ar at WHSV of 200,000 ml·$g_{cat}^{-1}$·$h^{-1}$.

Figure 21:
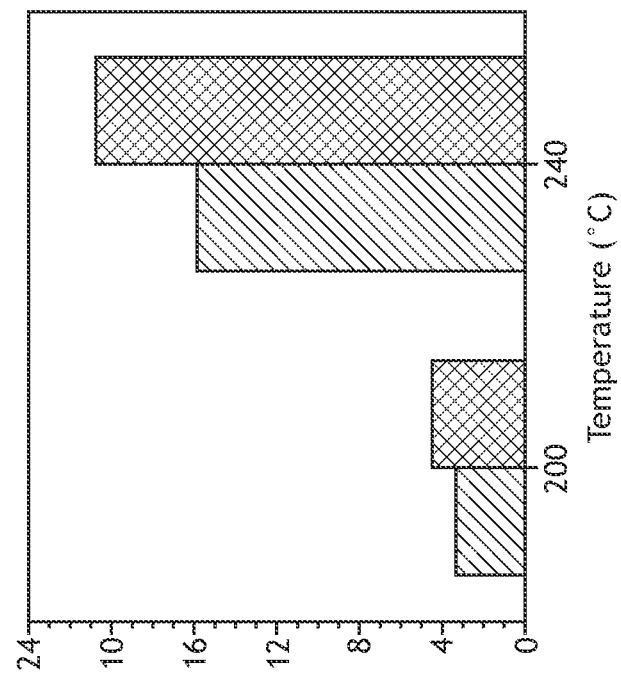
FIG. 21 is a bar chart of CO oxidation activity (at 200 and 240° C.) for catalyst 9 and reference catalyst 10, in accordance with one or more embodiments of the present disclosure.

FIG. 21 is a bar chart of CO oxidation activity (at 200 and 240° C.) for catalyst 9 and reference catalyst 10, in accordance with one or more embodiments of the present disclosure. In particular, the bar chart is generated based on steady state flow with [CO]=[$O_2$]=1% balanced with Ar at WHSV of 200,000 ml·$g_{cat}^{-1}$·$h^{-1}$.

FIGS. 20 and 21 further illustrate that the defect engineering process described herein may be extended to additional oxides including, but not limited to, $Fe_2O_3$ (FIG. 20) and CuO (FIG. 21).

In summary, the reduction of metal oxides (e.g., associated with step 1004 of method 100) by a reducing gas such as, but not limited to, $H_2$ or CO is a general way for engineering surface defects 1206 on reducible metal oxide 1202 supports. As illustrated in the non-limiting examples of FIGS. 13-21, the low temperature CO oxidation activity of supported Pt catalysts were largely improved. This represents a universal route for engineering surface defects 1206 of a metal oxide 1202 that can be extended to a wide range of metal oxide 1202 materials that lack sufficient naturally-occurring surface defects to be used as effective catalysts directly or catalyst supports for other metals/metal oxides.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A catalyst support structure comprising:
a base material;
a metal oxide support structure, wherein the metal oxide support structure is formed by:
loading a first concentration of precursors of a metal oxide onto the base material using incipient wetness impregnation (IWI) to form the catalyst support structure;
performing a first calcination process on the catalyst support structure at a first temperature to produce first structures of the metal oxide, wherein at least one of the first concentration or the first temperature are selected to produce mixed oxide species at an interface with the base material;
loading a second concentration of precursors of the metal oxide onto the catalyst support structure using IWI to at least partially cover the first structures of the metal oxide, wherein the second concentration is higher than the first concentration; and
performing a second calcination process on the catalyst support structure to produce second structures of the metal oxide; and
at least one of a metal or a metal oxide disposed on the metal oxide support structure, wherein the at least one of the metal or the metal oxide is formed by:
reducing the metal oxide support structure with a gas-phase reducing agent to generate a plurality of defect sites on a surface of the metal oxide support structure;
loading the at least one of the metal or the metal oxide onto the metal oxide support structure to generate a catalyst structure, wherein at least a portion of the metal or the metal oxide attaches to the plurality of defect sites; and
performing a calcination process on the catalyst structure.

2. The catalyst support structure of claim 1, wherein the metal oxide comprises:
a reducible metal oxide.

3. The catalyst support structure of claim 2, wherein the reducible metal oxide comprises:
at least one of a single metal oxide or a mixed metal oxide.

4. The catalyst support structure of claim 1, wherein in the metal oxide comprises:
at least of ceria, iron oxide, manganese oxide, or copper oxide, as well as their mixed metal oxides including ceria-zirconia, copper-cerium oxide, or iron-cobalt oxide.

5. The catalyst support structure of claim 1, wherein the base material comprises:
an irreducible metal oxide support.

6. The catalyst support structure of claim 5, wherein the irreducible metal oxide support comprises:
at least one of a single metal oxide support or a mixed metal oxide support.

7. The catalyst support structure of claim 1, wherein the base material comprises:
at least one of one of $Al_2O_3$, $SiO_2$, MgO, $ZrO_2$, $MgAl_2O_4$, or $La_2O_3$—$Al_2O_3$.

8. The catalyst support structure of claim 1, wherein at least one of the first calcination process or the second calcination process comprises:
heating the catalyst support structure in an atmosphere including oxygen at a temperature in a range from 350° C. to 900° C.

9. The catalyst support structure of claim 8, wherein heating the catalyst support structure in the atmosphere including oxygen comprises:
heating the catalyst support structure in the atmosphere including oxygen for at least an hour.

10. The catalyst support structure of claim 1, wherein the metal comprises:
at least one of Pt, Pd, Rh, Ir, or Au, or a transition metal.

11. The catalyst support structure of claim 1, wherein the metal oxide comprises:
at least one of copper oxide, nickel oxide, iron oxide or cobalt oxide.

12. The catalyst support structure of claim 1, wherein the first temperature is greater than 550° C.

13. The catalyst support structure of claim 1, wherein the first temperature is approximately 800° C.

14. The catalyst support structure of claim 1, wherein the first temperature is in a range of 550 to 1050° C.

15. The catalyst support structure of claim 1, wherein the second concentration is selected to produce the second structures of the metal oxide with a size scale smaller than a size scale of the first structures of the metal oxide.

* * * * *